(12) United States Patent
Matsumoto et al.

(10) Patent No.: US 12,429,691 B2
(45) Date of Patent: Sep. 30, 2025

(54) DISPLAY SYSTEM AND VIBRATION DETECTION SYSTEM

(71) Applicant: Panasonic Intellectual Property Management Co., Ltd., Osaka (JP)

(72) Inventors: Yusuke Matsumoto, Osaka (JP); Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 434 days.

(21) Appl. No.: 18/072,977

(22) Filed: Dec. 1, 2022

(65) Prior Publication Data

US 2023/0168502 A1 Jun. 1, 2023

Related U.S. Application Data

(63) Continuation of application No. PCT/JP2021/019535, filed on May 24, 2021.

(30) Foreign Application Priority Data

Jun. 8, 2020 (JP) .................................. 2020-099653

(51) Int. Cl.
  *G02B 27/01* (2006.01)
  *B60K 35/23* (2024.01)
  (Continued)

(52) U.S. Cl.
  CPC .......... *G02B 27/0101* (2013.01); *B60K 35/23* (2024.01); *B60K 35/233* (2024.01);
  (Continued)

(58) Field of Classification Search
  CPC .. B60K 2360/166; B60K 35/00; B60K 35/23; B60K 35/28; G01H 1/14; G01H 17/00;
  (Continued)

(56) References Cited

U.S. PATENT DOCUMENTS

| 2005/0212666 A1* | 9/2005 | Kawazoe | ............... G07C 5/085 340/436 |
| 2009/0164060 A1* | 6/2009 | Fortson | ............... B60R 21/0132 701/33.4 |

(Continued)

FOREIGN PATENT DOCUMENTS

| JP | 2015-101311 | 6/2015 |
| JP | 2017-022870 | 1/2017 |

OTHER PUBLICATIONS

JP2017013590A English translation (Year: 2017).*

(Continued)

*Primary Examiner* — Kyle R Quigley
(74) *Attorney, Agent, or Firm* — WENDEROTH, LIND & PONACK, L.L.P.

(57) ABSTRACT

A display system includes an attitude detection device configured to detect an attitude change amount of a moving body, and a correction processing device including a vibration detector configured to determine whether or not an attitude change in the moving body having a specific frequency band component has been continuously generated based on the attitude change amount. The correction processing device updates a correction amount of a display position of the image based on the attitude change amount when the vibration detector determines that the attitude change having the specific frequency band component has not been continuously generated, and sets an absolute value of the correction amount to be equal to or less than an absolute value of a correction amount at a time of last determination when the vibration detector determines that the attitude change having the specific frequency band component has been continuously generated.

14 Claims, 20 Drawing Sheets

(51) Int. Cl.
  B60K 35/233 (2024.01)
  B60K 35/81 (2024.01)
  G01H 1/14 (2006.01)
  G09G 3/00 (2006.01)
  B60K 35/28 (2024.01)
  B60K 35/29 (2024.01)
  B60K 35/60 (2024.01)

(52) U.S. Cl.
  CPC ............... B60K 35/81 (2024.01); G01H 1/14 (2013.01); G02B 27/0179 (2013.01); G09G 3/002 (2013.01); B60K 35/28 (2024.01); B60K 35/29 (2024.01); B60K 35/60 (2024.01); *G02B 2027/014* (2013.01); *G02B 2027/0183* (2013.01); *G09G 2340/0464* (2013.01); *G09G 2380/10* (2013.01)

(58) Field of Classification Search
  CPC ...... G02B 2027/014; G02B 2027/0181; G02B 2027/0183; G02B 27/01; G02B 27/0101; G02B 27/0179; G09G 2320/0261; G09G 2340/0464; G09G 2380/10; G09G 3/001; G09G 3/002; G09G 5/38
  See application file for complete search history.

(56) References Cited

U.S. PATENT DOCUMENTS

| | | | | |
|---|---|---|---|---|
| 2010/0066832 | A1* | 3/2010 | Nagahara | G02B 27/01 348/148 |
| 2011/0285518 | A1* | 11/2011 | Gordon | B60W 40/06 73/146 |
| 2015/0099945 | A1* | 4/2015 | Hawkins, III | A61B 5/1118 600/301 |
| 2016/0216521 | A1 | 7/2016 | Yachida et al. | |
| 2018/0101010 | A1* | 4/2018 | Nill | G02B 27/646 |
| 2018/0301137 | A1* | 10/2018 | Pfaffinger | G10K 11/17833 |
| 2019/0047528 | A1* | 2/2019 | Leone | B60T 8/17551 |
| 2019/0182638 | A1* | 6/2019 | Cordova | H04W 4/38 |
| 2019/0302453 | A1* | 10/2019 | Oshima | G03B 21/00 |
| 2019/0361237 | A1* | 11/2019 | Brandt | G02B 27/0149 |
| 2020/0012103 | A1* | 1/2020 | Kasazumi | G02B 27/0101 |
| 2020/0064640 | A1* | 2/2020 | Nagano | G09G 3/001 |
| 2020/0333164 | A1* | 10/2020 | Romrell | G01C 22/006 |
| 2021/0339744 | A1* | 11/2021 | Rollinger | B60W 30/143 |

OTHER PUBLICATIONS

KR20180003155A English translation (Year: 2018).*
Hosseini et al., System Design for Automotive Augmented Reality, IEEE, 2014 (Year: 2014).*
Coni et al., The Future of Holographic Head-Up Display, IEEE, 2019 (Year: 2019).*
Park et al., Projector-based Full Windshield HUD Simulator, IEEE, 2014 (Year: 2014).*
Wientapper et al., Camera-Based Calibration for Automotive Augmented Reality, IEEE, 2013 (Year: 2013).*
Blahut, Chapter 25, Reference Data for Engineers 9th Edition, 2002 (Year: 2002).*
International Preliminary Report on Patentability issued Dec. 13, 2022 in International (PCT) Application No. PCT/JP2021/019535.
International Search Report issued Aug. 10, 2021 in International (PCT) Application No. PCT/JP2021/019535.
Office Action issued Jun. 10, 2025 in corresponding Japanese Patent Application No. 2022-530104.

* cited by examiner

DISPLAY SYSTEM AND VIBRATION DETECTION SYSTEM

CROSS-REFERENCE TO RELATED APPLICATIONS

This is a continuation application of International Application No. PCT/JP2021/019535, with an international filing date of May 24, 2021, which claims priority of Japanese Patent Application No. 2020-099653 filed on Jun. 8, 2020, the content of which is incorporated herein by reference.

BACKGROUND OF THE INVENTION

1. Technical Field

The present disclosure relates to a display system that controls a display position of an image in response to vibration of a moving body, and a vibration detection system that detects vibration generated in the moving body.

2. Description of the Related Art

JP 2015-101311 A discloses a vehicle information projection system that performs augmented reality (AR) display using a head-up display (HUD) device. The HUD device projects light representing a virtual image on a windshield of a vehicle, which allows a viewer being an occupant of the vehicle to visually recognize the virtual image together with an actual view of the outside of the vehicle. For example, a virtual image representing a guide route of the vehicle is displayed in association with a display target (for example, a road) in the actual view. Accordingly, the occupant can check the guide route while visually recognizing the actual view. The vehicle information projection system in JP 2015-101311 A includes a vehicle speed sensor, and corrects a display position of a virtual image according to acceleration. Accordingly, the occurrence of positional deviation of the virtual image at the time of sudden deceleration and sudden acceleration of the vehicle is suppressed.

SUMMARY

When the vehicle vibrates according to the state of the traveling path on which the vehicle travels, the occupant sees the actual view vibrating. When the display position of the virtual image is corrected in accordance with the vibration of the vehicle, the correction of the display position of the virtual image causes a time lag with respect to the vibration of the vehicle. For example, in the case of vibration in a specific frequency band being a high-frequency band higher than a certain frequency, when the ratio of the time lag from the correction amount calculation of the virtual image to the display with respect to the vibration cycle of the vehicle becomes equal to or greater than a certain value, the display deviation may be enlarged. Therefore, it is necessary to detect vibration in a specific frequency band generated in a moving body such as a vehicle and to suppress enlargement of a correction error of a display deviation when vibration in a specific frequency band occurs in the moving body.

The present disclosure provides a display system that suppresses enlargement of a correction error and a vibration detection system that detects vibration generated in a moving body.

A display system of the present disclosure includes: a display processing device configured to control display of an image; an attitude detection device configured to detect an attitude change amount of a moving body; and a correction processing device including a vibration detector configured to determine whether or not the attitude change in the moving body having a specific frequency band component has been continuously generated for a certain period of time or more based on the attitude change amount. The correction processing device updates a correction amount of a display position of the image based on the attitude change amount when the vibration detector determines that an attitude change in the moving body having a specific frequency band component has not been continuously generated for a certain period of time or more, and sets an absolute value of the correction amount to be equal to or less than an absolute value of a correction amount at a time of last determination when the vibration detector determines that the attitude change in the moving body having the specific frequency band component has been continuously generated for the certain period of time or more. The vibration detector includes: a threshold value cross detector configured to detect that the attitude change amount or a variation amount calculated based on the attitude change amount has crossed a predetermined threshold value, a counter configured to measure the number of times the attitude change amount or the variation amount has crossed the threshold value in a unit time, and a vibration determiner configured to determine that the attitude change in the moving body having the specific frequency band component has been continuously generated for the certain period of time or more when the number of times measured by the counter is a count threshold value or more. The display processing device controls a display position of the image based on the correction amount.

In addition, a vibration detection system of the present disclosure includes: an attitude detection device configured to detect an attitude change amount of a moving body; a threshold value cross detector configured to detect that the attitude change amount or a variation amount calculated based on the attitude change amount has crossed a predetermined threshold value; a counter configured to measure the number of times the attitude change amount or the variation amount has crossed the threshold value in a unit time; and a vibration determiner configured to determine that an attitude change in a moving body having a specific frequency band component has been continuously generated for a certain period of time or more when the number of times measured by the counter is a count threshold value or more.

These general and specific aspects may be implemented by a system, a method, and a computer program, and a combination thereof.

According to the display system and the vibration detection system of the present disclosure, it is possible to provide a display system in which enlargement of a correction error is suppressed and a vibration detection system that detects vibration generated in a moving body.

BRIEF DESCRIPTION OF THE DRAWINGS

FIG. 14A is an explanatory diagram showing an example of counting using a positive threshold value, and FIG. 14B is an explanatory diagram showing an example of counting using a negative threshold value.

DESCRIPTION OF THE EMBODIMENT(S)

Figure 1:
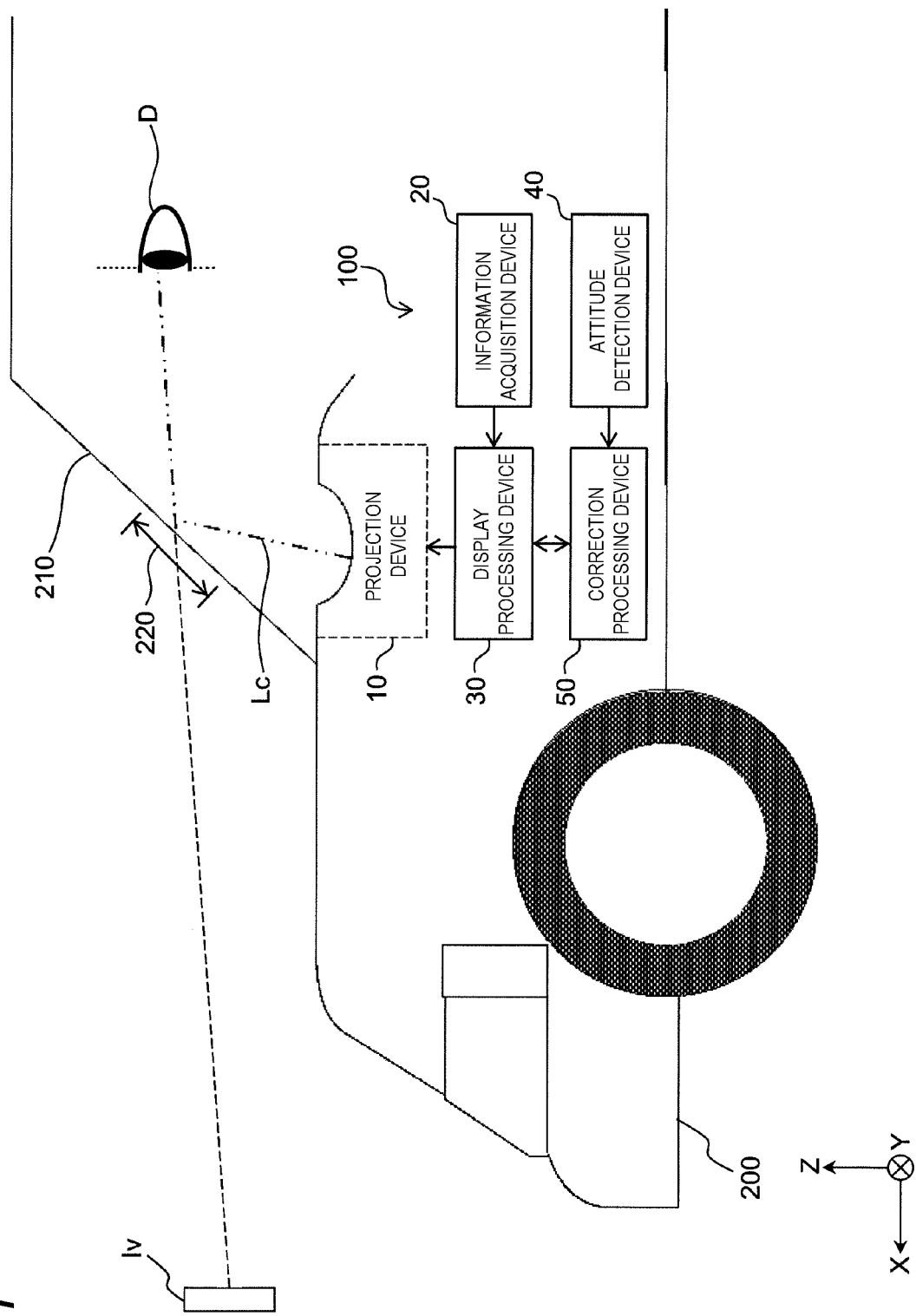
FIG. 1 is a diagram for illustrating a head-up display (HUD)

The attitude change amount of the moving body is detected by the attitude detection device. The attitude change amount is, for example, an angular velocity. In addition, a variation amount being a value obtained by performing arithmetic processing on the attitude change amount is detected. It should be noted that the variation amount may be a value using the attitude change amount as it is.

For example, it is conceivable to use a gyro sensor in order to detect the attitude state of the moving body with high accuracy. The angles (roll angle, pitch angle, and yaw angle) around the three axes of the moving body being the variation amount of the moving body are obtained by performing integration operation on each of the angular velocities around the three axes as the attitude change amount detected by the gyro sensor. When the pitch angle is used as the variation amount of the moving body, for example, the pitch angle is 0° when the moving body is in the horizontal state, and thus the variation amount of the moving body is the rotation amount in the pitch direction based on the horizontal state of the moving body. It should be noted that the pitch direction refers to a rotation direction with the left-right direction perpendicular to the traveling direction of the moving body as an axis.

When the display position of the image is corrected according to the attitude state of the moving body detected based on the detection result of the attitude detection device, vibration in the pitch direction of the moving body due to the surface state of the road surface is detected as a variation of the pitch angle, and the display position of the image is corrected according to the variation of the pitch angle. The vibration frequency of the moving body varies depending on the state of the unevenness of the traveling path. When the vibration cycle of the vibration of the moving body due to the unevenness of the traveling path is sufficiently short with respect to the time lag from the correction amount calculation of the image to the display, vibration of the display can be suppressed. However, when the vibration cycle of the vibration of the moving body due to the unevenness of the traveling path is close to the time lag of the correction of the display position, the display deviation may be amplified.

The display system of the present disclosure detects the attitude change amount of the moving body, and adjusts the correction amount of the display position of the image when the variation amount calculated based on the attitude change amount includes a component in a specific frequency band. Accordingly, even when the vibration cycle of the vibration of the moving body due to the unevenness of the traveling path is close to the time lag of the correction of the display position, it is possible to reduce the enlargement of the correction error.

First Embodiment

Hereinafter, a first embodiment will be described with reference to the drawings. In the first embodiment, a case where the moving body is a vehicle such as an automobile and the display system is a head-up display system (hereinafter, referred to as an HUD system) that displays a virtual image as an image in front of a windshield of the vehicle will be described as an example.

1. Configuration of Display System

FIG. 1 is a diagram for illustrating an HUD system. In FIG. 1, a roll axis of the vehicle 200 is an X-axis, a pitch axis of the vehicle 200 is a Y-axis, and a yaw axis of the vehicle 200 is a Z-axis. That is, the X-axis is orthogonal to the Y-axis and the Z-axis, and is an axis along the sight line direction of the occupant D who visually recognizes the virtual image Iv. The Y-axis is an axis along the left-right direction as viewed from the occupant D who visually recognizes the virtual image Iv, and is an axis in the left-right direction with respect to the traveling direction of the vehicle 200. The Z-axis is an axis along the height direction of the vehicle 200.

The display system 100 of the present embodiment is an HUD system that performs what is called augmented reality (AR) display in which the virtual image Iv is superimposed on an actual view in front of the windshield 210 of the vehicle 200. The virtual image Iv indicates predetermined information. For example, the virtual image Iv is graphics and characters indicating a route for guiding to a destination, an expected arrival time at the destination, a traveling direction, a speed, various warnings, and the like. The display system 100 is installed in the vehicle 200, and projects the display light Lc representing the virtual image Iv onto within the display area 220 of the windshield 210 of the vehicle 200. In the present embodiment, the display area 220 is a partial area of the windshield 210. It should be noted that the display area 220 may be the entire area of the windshield 210. The display light Lc is reflected by the windshield 210 toward the vehicle interior. Accordingly, the occupant (viewer) D in the vehicle 200 visually recognizes the reflected display light Lc as the virtual image Iv in front of the vehicle 200.

The display system 100 includes a projection device 10, an information acquisition device 20, a display processing device 30, an attitude detection device 40, and a correction processing device 50. It should be noted that the attitude detection device 40 and the vibration detector 52c of the correction controller 52 of the correction processing device 50 constitute a vibration detection system 60.

The projection device 10 projects the display light Lc representing the virtual image Iv onto within the display area 220. The projection device 10 includes, for example, a liquid crystal display element that displays an image of the virtual image Iv, a light source such as an LED that illuminates the liquid crystal display element, a mirror and a lens that reflect the display light Lc of the image displayed by the liquid crystal display element onto the display area 220, and the like. The projection device 10 is installed, for example, within a dashboard of the vehicle 200.

The information acquisition device 20 acquires positional information of the vehicle. Specifically, the information acquisition device 20 measures the position of the vehicle 200 and generates positional information indicating the position. The information acquisition device 20 outputs vehicle-related information at least including positional information of the vehicle 200. It should be noted that the information acquisition device 20 may acquire vehicle exterior information indicating an object, a distance to the object, and the like. The vehicle-related information may include the acquired vehicle exterior information.

The display processing device 30 controls the display of the virtual image Iv based on the vehicle-related information or the like obtained from the information acquisition device 20, and outputs the image data on the virtual image Iv to the projection device 10. The display processing device 30 may control the display of the virtual image Iv based on a display timing (display time) of the virtual image Iv or a combination of the vehicle-related information and the display timing. The display timing is, for example, to repeat display for 10 seconds and non-display for 1 second.

The attitude detection device 40 acquires an attitude change amount of the vehicle 200. In the present embodiment, the attitude detection device 40 includes, for example, a gyro sensor 41 that detects an angular velocity of the vehicle 200. The gyro sensor 41 outputs the detected angular velocity to the correction processing device 50 as an attitude change amount indicating an attitude of the vehicle 200.

The correction processing device 50 calculates the correction amount of the display position of the virtual image Iv based on the attitude change amount of the vehicle 200 detected by the attitude detection device 40.

Figure 2:
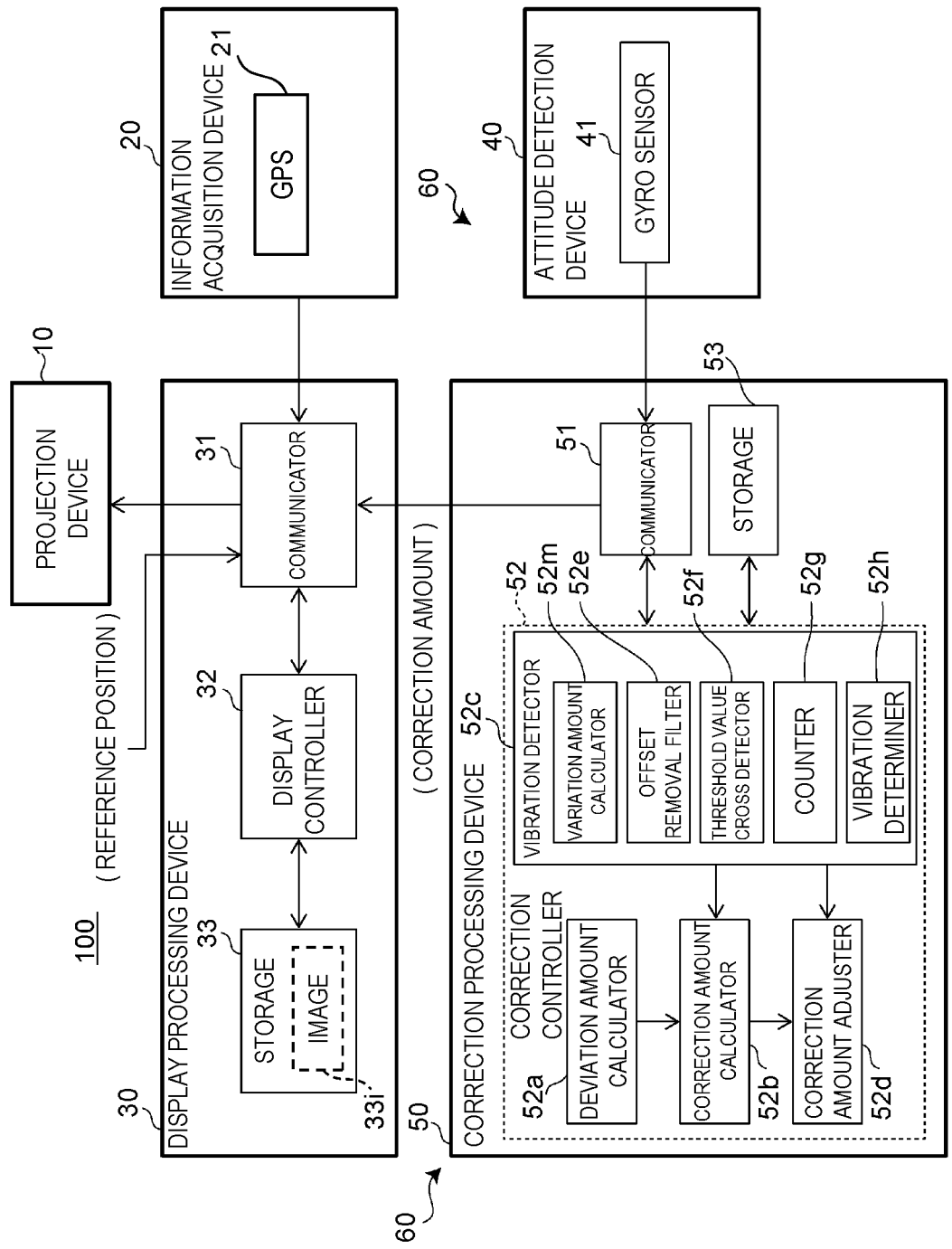
FIG. 2 is a block diagram showing an internal configuration of a display system in a first embodiment.

FIG. 2 is a block diagram showing an internal configuration of the display system 100.

In the present embodiment, the information acquisition device 20 includes a global positioning system (GPS) module 21 that detects a position indicating the current location of the vehicle 200 in the geographic coordinate system. Specifically, the GPS module 21 receives a radio wave from a GPS satellite and positions the latitude and longitude of the received point. The GPS module 21 generates positional information indicating the positioned latitude and longitude. The information acquisition device 20 may further include a camera that images an outside view and generates imaging data. For example, the information acquisition device 20 may specify the object from the imaging data by image processing and measure the distance to the object. In this case, the information acquisition device 20 may generate the object and the information indicating the distance to the object as the vehicle exterior information. The information acquisition device 20 outputs vehicle-related information including positional information to the display processing device 30. It should be noted that the imaging data generated by the camera may be output to the display processing device 30.

The display processing device 30 includes a communicator 31, a display controller 32, and a storage 33.

The communicator 31 includes a circuit that communicates with an external apparatus in conformity with the predetermined communication standards (for example, LAN, Wi-Fi (registered trademark), Bluetooth (registered trademark), USB, HDMI (registered trademark), controller area network (CAN), and serial peripheral interface (SPI)).

The display controller 32 can be achieved with an integrated circuit including semiconductor elements or the like. The display controller 32 can include, for example, a microcomputer, a CPU, an MPU, a GPU, a DSP, an FPGA, or an ASIC. The function of the display controller 32 may be configured only by hardware, or may be implemented by combining hardware and software. The display controller 32 reads data and programs stored in the storage 33 and performs various arithmetic processing to implement a predetermined function.

The storage 33 is a storage medium that stores programs and data necessary for implementing the functions of the display processing device 30. The storage 33 can be implemented by, for example, a hard disk (HDD), an SSD, a RAM, a DRAM, a ferroelectric memory, a flash memory, a magnetic disk, or a combination thereof.

The storage 33 stores a plurality of pieces of image data 33i representing the virtual image Iv. The display controller 32 determines the virtual image Iv to be displayed based on the vehicle-related information obtained from the information acquisition device 20. The display controller 32 reads the image data 33i on the determined virtual image Iv from the storage 33 and outputs the image data to the projection device 10. Furthermore, the display controller 32 sets the display position of the virtual image Iv. The display controller 32 outputs display information indicating whether or not the virtual image Iv is to be displayed or whether or not the virtual image Iv is being displayed to the correction processing device 50.

The correction processing device 50 includes a communicator 51, a correction controller 52, and a storage 53.

The communicator 51 includes a circuit that communicates with an external apparatus in conformity with the predetermined communication standards (for example, LAN, Wi-Fi (registered trademark), Bluetooth (registered trademark), USB, HDMI (registered trademark), controller area network (CAN), and serial peripheral interface (SPI)).

The correction controller 52 is an arithmetic device implementable with an integrated circuit including semiconductor elements or the like. The correction controller 52 can include, for example, a microcomputer, a CPU, an MPU, a GPU, a DSP, an FPGA, or an ASIC. The function of the correction controller 52 may be configured only by hardware, or may be implemented by combining hardware and software. The correction controller 52 reads data and programs stored in the storage 53 in the correction processing device 50 and performs various pieces of arithmetic processing, to implement a predetermined function.

The correction controller 52 includes a deviation amount calculator 52a, a correction amount calculator 52b, a vibration detector 52c, and a correction amount adjuster 52d as functional configurations.

The deviation amount calculator 52a calculates the angle deviation amount of the vehicle 200 based on the attitude change amount output by the attitude detection device 40. The angle deviation amount is an attitude angle with respect to an attitude state serving as a reference of the moving body. The attitude state serving as a reference of the moving body is, for example, a horizontal state. For example, the deviation amount calculator 52a calculates the angle (pitch angle) around the pitch axis of the vehicle 200 by performing integration operation on the pitch angular velocity detected by the gyro sensor 41. Accordingly, it is possible to detect the deviation amount (angle) of the vehicle 200 in the rotation direction with the Y-axis (pitch axis) shown in FIG. 1 as a central axis. It should be noted that in the present embodiment, the pitch angle is calculated, but the yaw angle or the roll angle may be calculated. For example, all the angles around the X-axis, the Y-axis, and the Z-axis may be calculated.

The correction amount calculator 52b calculates the correction amount of the display position of the virtual image Iv according to the angle deviation amount of the vehicle 200. Specifically, the correction amount calculator 52b converts the deviation amount of the angle (pitch angle) calculated by the deviation amount calculator 52a into the number of pixels, and determines such a correction amount as returns the number of pixels deviated (hereinafter, also referred to as "the number of deviation pixels") to the original value. The correction amount calculator 52b outputs the calculated correction amount to the display processing device 30. It should be noted that in the present embodiment, the correction amount around the pitch axis is calculated, but the correction amount around the yaw axis and the roll axis may be calculated. With respect to the roll angle, such a correction amount as returns the deviation amount of the roll angle to the original value is determined while the angle is left as it is.

The vibration detector 52c detects whether the signal to be input includes a specific frequency band component. The vibration detector 52c includes a variation amount calculator 52m, an offset removal filter 52e, a threshold value cross detector 52f, a counter 52g, and a vibration determiner 52h.

The variation amount calculator 52m calculates the variation amount of the vehicle 200 based on the attitude change amount output by the attitude detection device 40. For example, the variation amount calculator 52m calculates the angle (pitch angle) around the pitch axis of the vehicle 200 by performing integration operation on the pitch angular velocity detected by the gyro sensor 41 as the variation amount. Accordingly, it is possible to detect the variation amount (pitch angle) of the vehicle 200 in the rotation direction with the Y axis (pitch axis) shown in FIG. 1 as the central axis. It should be noted that in the present embodiment, the pitch angle is calculated, but the yaw angle or the roll angle may be calculated. For example, all the angles around the X-axis, the Y-axis, and the Z-axis may be calculated. It should be noted that since both the deviation amount calculated by the deviation amount calculator 52a and the variation amount calculated by the variation amount calculator 52m are angle information, they may be shared or may be calculated as separate angle information. It should be noted that the variation amount may be a value using the attitude change amount as it is. In addition, when the attitude change amount is used as it is as the variation amount, the variation amount calculator may be omitted.

The offset removal filter 52e removes an offset component of the input signal (variation amount), and as a result, attenuates a low frequency band component of the input signal. The offset removal filter 52e is, for example, a high-pass filter. The relationship between the cutoff frequency Fc of the offset removal filter 52e and the frequency band lower limit F to be detected satisfies, for example, the following inequality (1).

$$Fc < F \leq 1/(2 \times T \text{ [sec]})\qquad(1)$$

T is a total delay time (time lag) [sec] from the calculation of the correction amount of the virtual image to the display. However, the frequency setting method is not limited to inequality (1), and may be appropriately adjusted. The lower limit F of the frequency band to be detected is, for example, 2.5 Hz.

The threshold value cross detector 52f detects that an input value has crossed a predetermined threshold value. Here, "detecting that the input value has crossed a threshold value" means, for example, detecting that the input value has changed from less than the threshold value to greater than or equal to the threshold value or from greater than or equal to the threshold value to less than the threshold value. When detecting that the threshold value has been crossed, the threshold value cross detector 52f outputs a detection signal to the counter 52g. The threshold value is, for example, zero or any specific value. The any specific value is, for example, a value of an offset error.

The counter 52g measures the number of times the input value to the threshold value cross detector 52f has crossed a predetermined threshold value. That is, the counter 52g counts the number of times of detection signals input from the threshold value cross detector 52f to the counter 52g.

Based on the number of times measured by the counter 52g per unit time, the vibration determiner 52h determines whether a specific frequency band component has been generated in the variation amount for a certain period of time or more. For example, the vibration determiner 52h is provided with a time window, and determines generation of vibration having a specific frequency band component based on a change amount of the count value in a certain period of time. In this way, for example, generation of vibration having a frequency band component of 2.5 Hz or more can be detected. The determination result is sent from the vibration determiner 52h to the correction amount calculator 52b and the correction amount adjuster 52d.

The correction amount adjuster 52d adjusts the correction amount based on the determination result of the vibration determiner 52h. When the vibration determiner 52h determines that an attitude change in the vehicle 200 having a specific frequency band component has been continuously generated for a certain period of time or more, as adjustment of the correction amount, the sign of the correction amount is set to be the same as the sign of the correction amount when the vibration determiner 52h last determined, and the absolute value of the correction amount is set to be equal to or less than the absolute value of the correction amount when the vibration determiner 52h last determined. In the first embodiment, when the correction amount needs to be adjusted, the correction amount is adjusted to zero.

The storage 53 is a storage medium that stores programs and data necessary for implementing the functions of the correction controller 52. Therefore, for example, programs and data necessary for causing an arithmetic device such as a processor to function as the correction amount calculator 52b are also stored in the storage 53. The storage 53 can be implemented by, for example, a hard disk (HDD), an SSD, a RAM, a DRAM, a ferroelectric memory, a flash memory, a magnetic disk, or a combination thereof.

The correction processing device 50 outputs the correction amount to the display processing device 30.

Figure 3A:
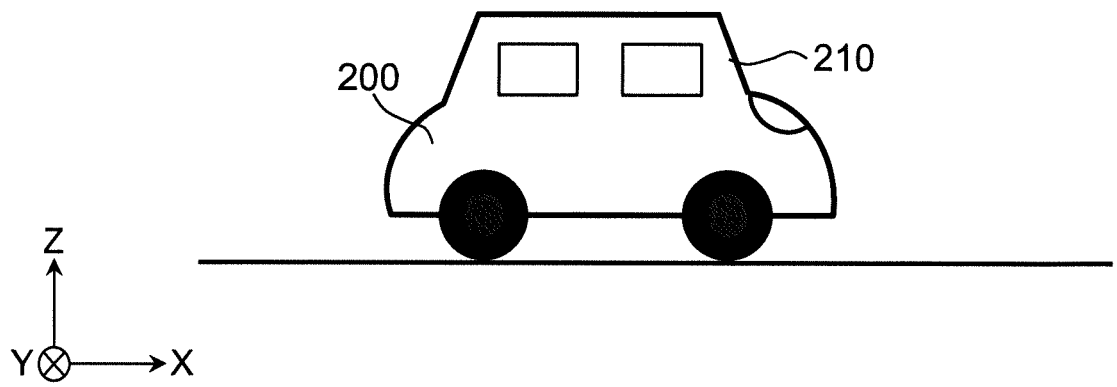
FIG. 3A is a diagram showing an example when the vehicle is not inclined.
Figure 3B:
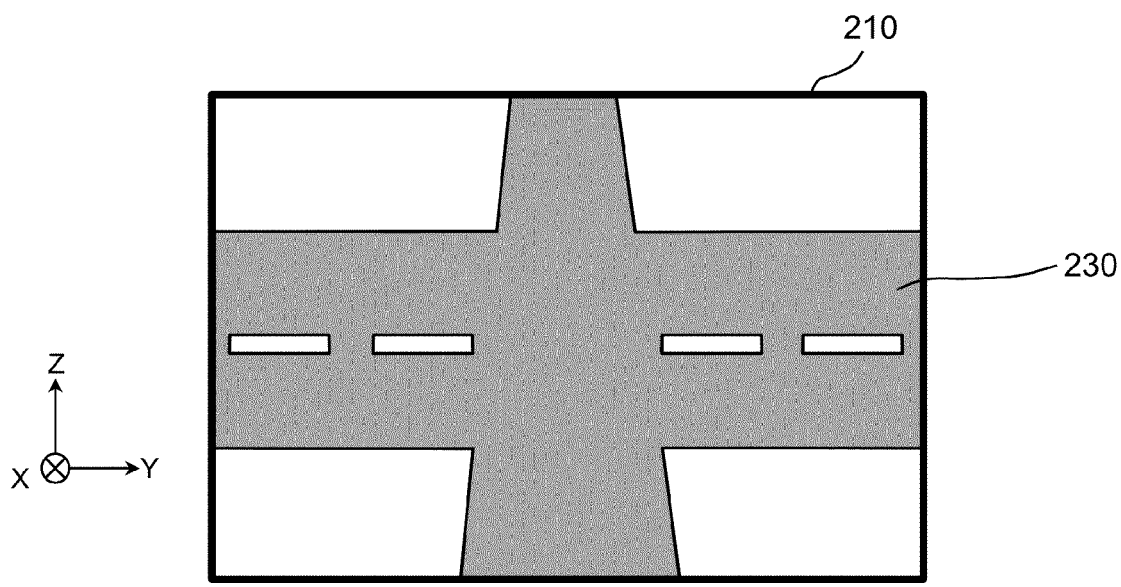
FIG. 3B is a view showing an example of an actual view visible from a windshield.
Figure 3C:
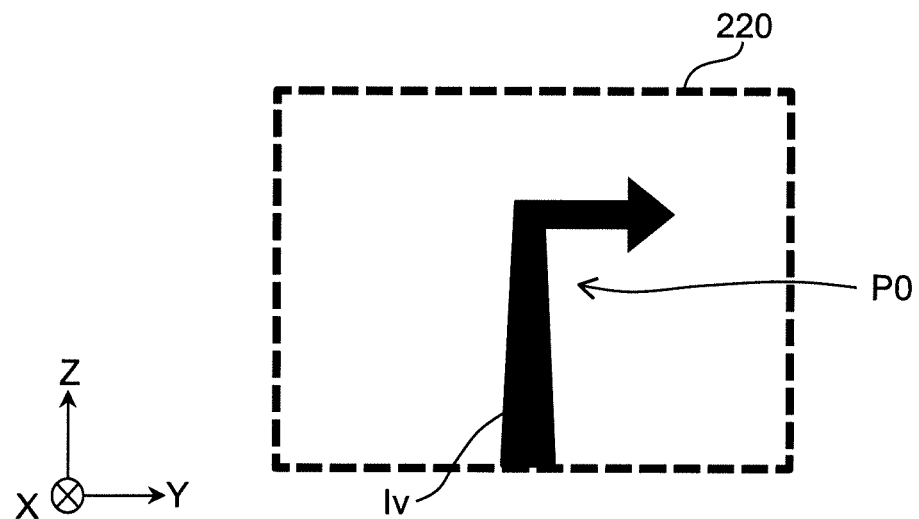
FIG. 3C is a view showing an example in which a virtual image is displayed at a reference position.
Figure 3D:
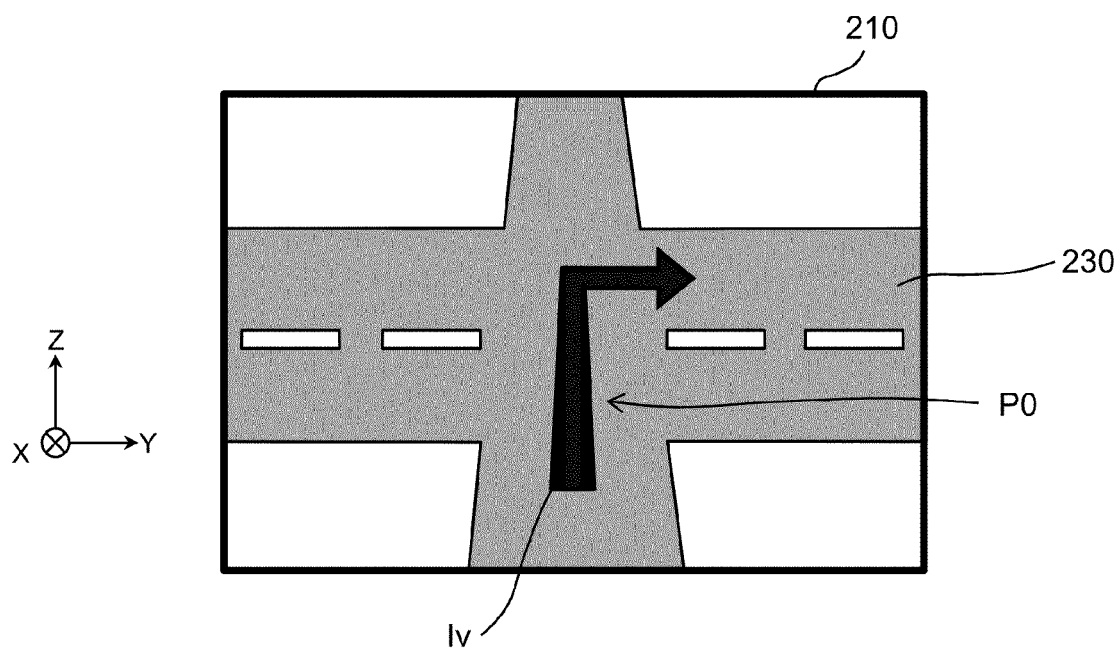
FIG. 3D is a view showing an example of augmented reality (AR) display.

Next, the AR display will be described with reference to FIGS. 3A to 3D. FIG. 3A shows an example when the vehicle 200 is not inclined. FIG. 3B shows an example of an actual view visible from the windshield 210 of the vehicle 200 shown in FIG. 3A. FIG. 3C shows an example of a virtual image Iv visible from the display area 220. FIG. 3D shows an example in which the virtual image Iv shown in FIG. 3C is displayed to be superimposed on the actual view shown in FIG. 3B.

The display system 100 superimposes the virtual image Iv shown in FIG. 3C on the actual view shown in FIG. 3B. The reference position (initial position) P0 of the virtual image Iv is a position determined based on the type of the virtual image Iv, the state (position and attitude) of the vehicle 200, map data, and the like, and the reference position P0 is determined by an external device. For example, when the display target 230 is a traveling lane and the virtual image Iv is an arrow indicating the traveling direction, the reference position P0 is a display position on the liquid crystal when the tip of the arrow points the center of the traveling lane. For example, in FIG. 3C, the reference position P0 is set at the position of the pixel on the liquid crystal display corresponding to the values of the Y coordinate and the Z coordinate in the display area 220. The reference position P0 is acquired from an external device.

The external device can include, for example, a microcomputer, a CPU, an MPU, a GPU, a DSP, an FPGA, or an ASIC, and the GPS module 21. The function of the external device may be configured only by hardware, or may be implemented by combining hardware and software. The reference position P0 output from the external device may change based on variation in attitude, due to the number of occupants, variation in load, a decrease in gasoline, and the like, and thus may be different from the reference position (initial position) acquired first, for example. Therefore, the display processing device 30 may change the reference position P0 acquired from the external device based on variation in attitude, due to the number of occupants, variation in load, a decrease in gasoline, and the like. It should be noted that the display processing device 30 may set the reference position P0 based on the vehicle-related information, the map data, and the like. The display processing device 30 may set the size of the virtual image Iv based on the vehicle-related information.

Figure 4A:
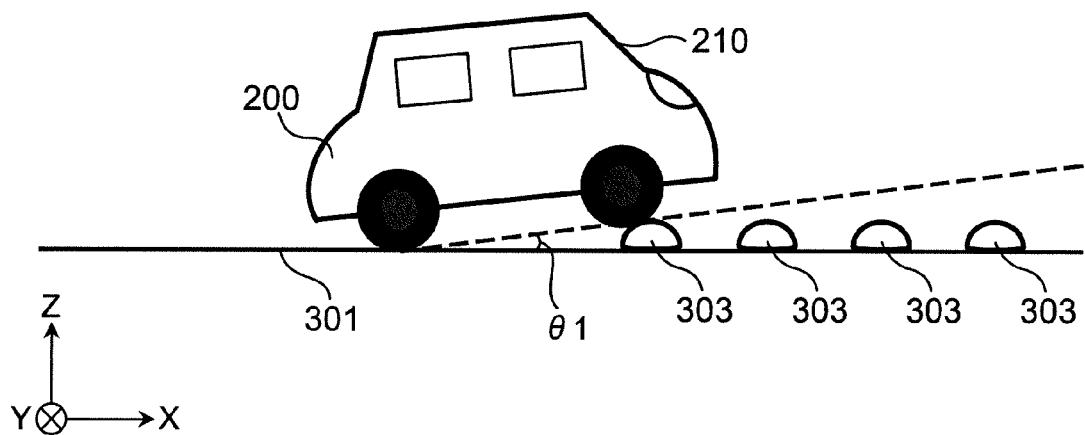
FIG. 4A is a view showing a backward tilting attitude of the vehicle.
Figure 4B:
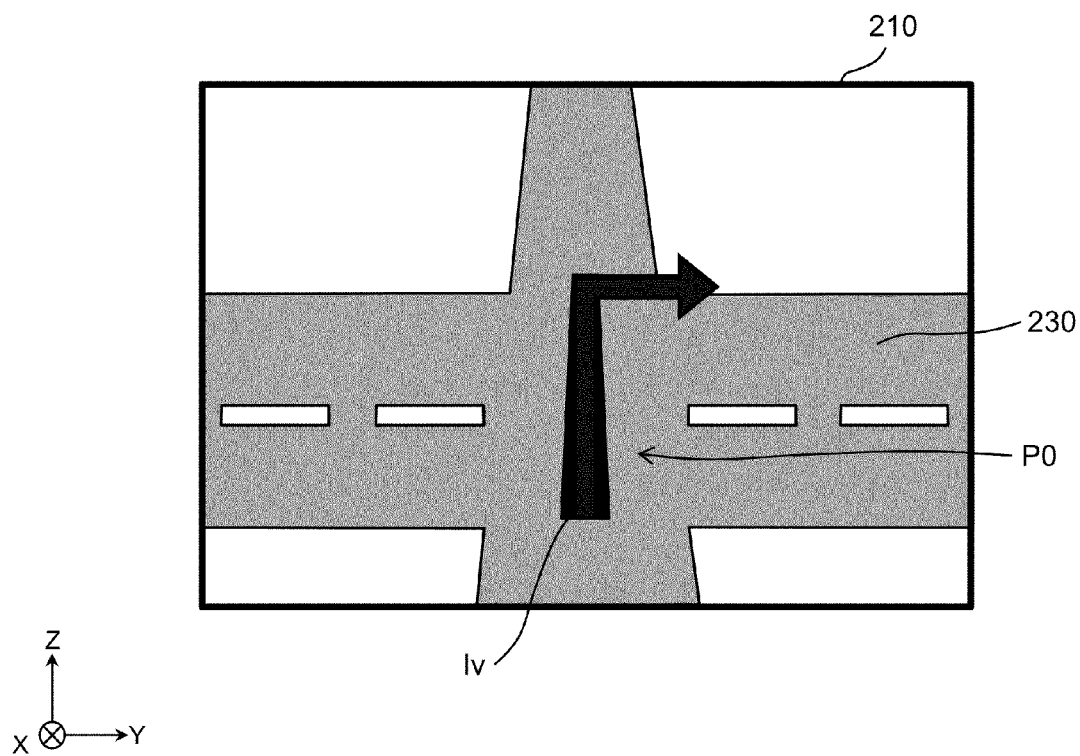
FIG. 4B is a view for illustrating an example in which positional deviation of a virtual image occurs when the vehicle is in a backward tilting attitude.
Figure 4C:
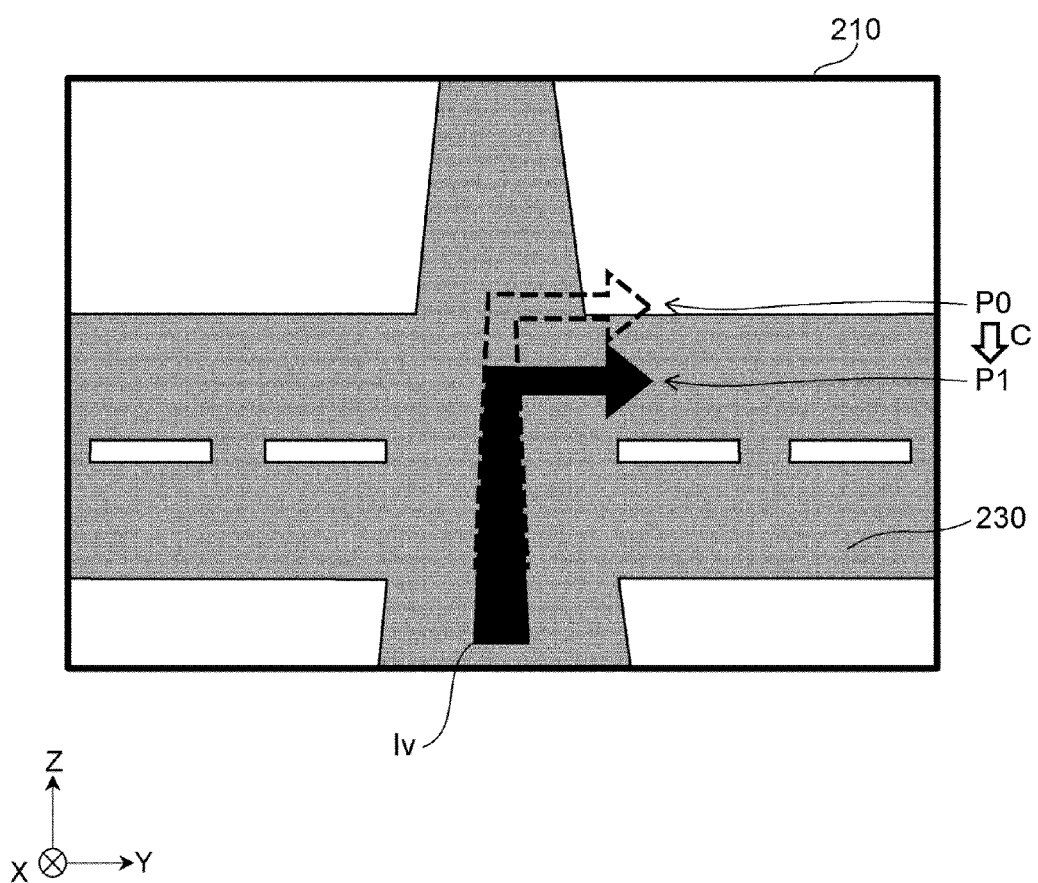
FIG. 4C is a view showing a display example of a virtual image after correction.

FIG. 4A shows an example of a state in which the vehicle 200 is in a backward tilting attitude. FIG. 4B illustrates a case where the display position of the virtual image Iv is deviated from the display target 230 according to the attitude variation of the vehicle 200. FIG. 4C shows the display position of the virtual image Iv after the correction.

The vehicle 200 may incline due to unevenness of a road surface, sudden acceleration or sudden deceleration of the vehicle 200, or the like. For example, as shown in FIG. 4A, when the vehicle 200 runs onto the protruding portion 303 on the road surface 301, the vehicle 200 takes a backward tilting attitude. In this case, as shown in FIG. 4B, the position of the display target 230 visible from the windshield 210 varies according to the inclination θ1 with respect to traveling path of the vehicle 200. Therefore, when the virtual image Iv is displayed at the reference position P0, the virtual image Iv is deviated from the display target 230.

For example, when the vehicle 200 takes the backward tilting attitude due to the protruding portion 303 on the road surface 301, the position of the display target 230 varies downward compared to that during the normal traveling as shown in FIG. 4B. Therefore, the tip of the arrow of the virtual image Iv displayed at the reference position P0 is deviated to the outside of the lane. Therefore, the display system 100 adjusts the display position of the virtual image Iv to the direction of returning the deviation according to the attitude of the vehicle 200.

Specifically, as shown in FIG. 4C, the correction processing device 50 calculates the correction amount C so as to be a position P1 where there is no deviation in the display position due to the angle of the vehicle 200. That is, the display processing device 30 sets the display position of the virtual image Iv to "reference position P0+correction amount C". Accordingly, the projection device 10 can display the virtual image Iv at the position P1 corresponding to the display target 230. As described above, even when the vehicle 200 is inclined, by changing the display position of the virtual image Iv from the reference position P0 based on the correction amount C, the virtual image Iv can be displayed at the position P1 corresponding to the display target 230 in the actual view.

As shown in FIG. 4A, the vehicle 200 continuously vibrates, when protruding portions 303 are continuously present on the road surface 301, or due to the state of the road surface 301. In this case, the display position of the virtual image Iv also vibrates. Since there is a time lag in the display of the virtual image Iv after the attitude change in the vehicle 200 is detected, when the timing of a new attitude change in the vehicle 200 coincides with the display position corrected for the previously detected vibration, the display deviation due to the correction error is enlarged. A method of suppressing the enlargement of the display deviation will be described below.

2. Operation of Display Processing Device

Figure 5:
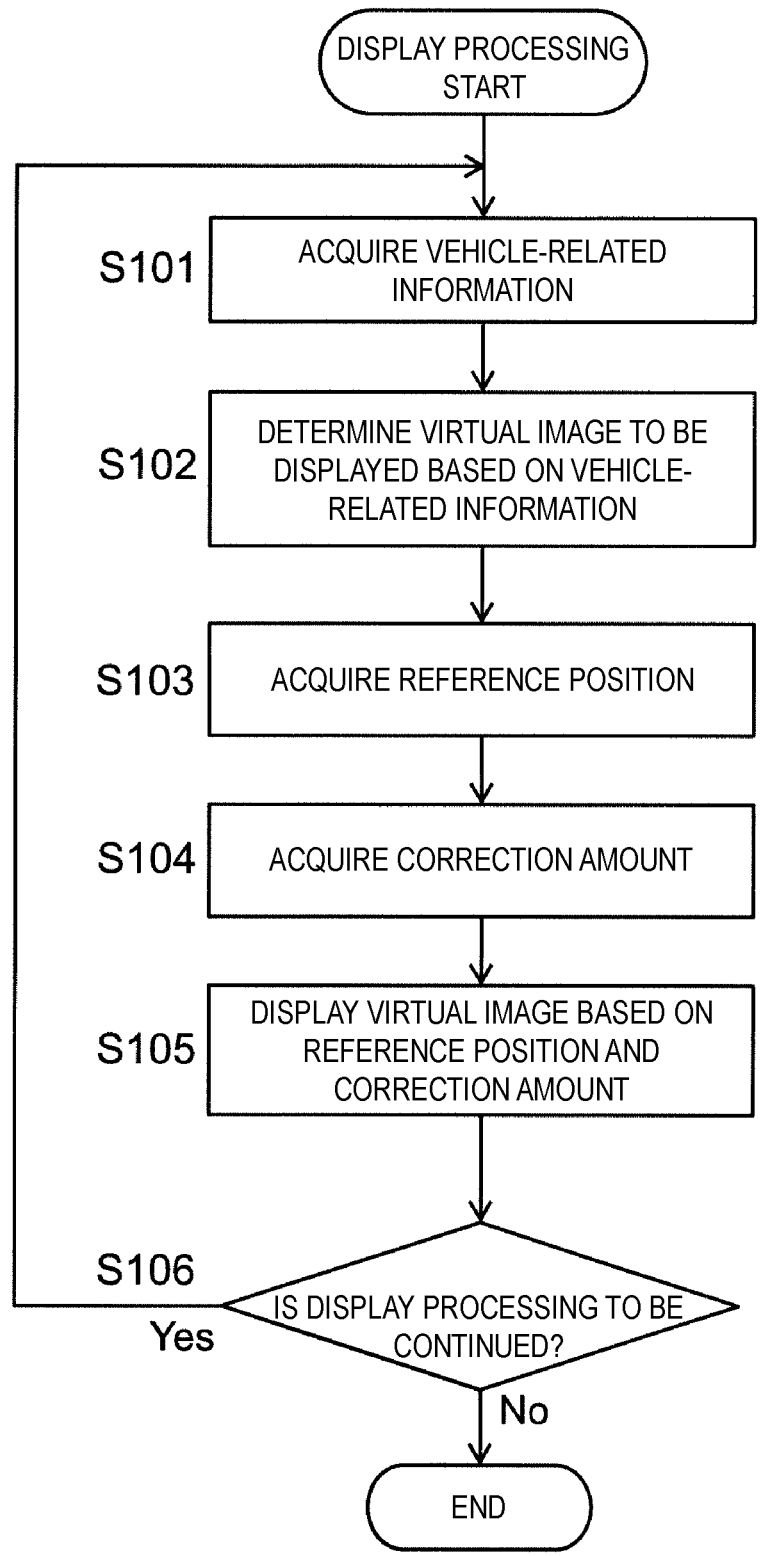
FIG. 5 is a flowchart showing display processing in a first embodiment.

FIG. 5 shows display processing performed by the display controller 32 of the display processing device 30. The display processing shown in FIG. 5 is started, for example, when the engine of the vehicle 200 is started, or when a button for instructing the start of the display of the virtual image Iv is operated.

The display controller 32 acquires vehicle-related information from the information acquisition device 20 (S101). The display controller 32 determines the virtual image Iv to be displayed based on the vehicle-related information (S102). The display controller 32 acquires the reference position P0 of the virtual image Iv from the external device (S103). The display controller 32 acquires the correction amount C of the display position output from the correction processing device 50 (S104).

The display controller 32 causes the projection device 10 to display the virtual image Iv based on the reference position P0 and the correction amount C (S105). For example, the display controller 32 reads the image data 33i of the virtual image Iv corresponding to the display target from the storage 33, sets the display position of the virtual image Iv to "reference position P0+correction amount C", and outputs the result to the projection device 10.

The display controller 32 determines whether to continue the display processing (S106). For example, when the engine of the vehicle 200 is stopped, when a button for instructing termination of display of the virtual image Iv is operated, or the like, the display controller 32 terminates the display processing. If the display processing is continued, the process returns to step S101.

3. Operation of Correction Processing Device

Figure 6:
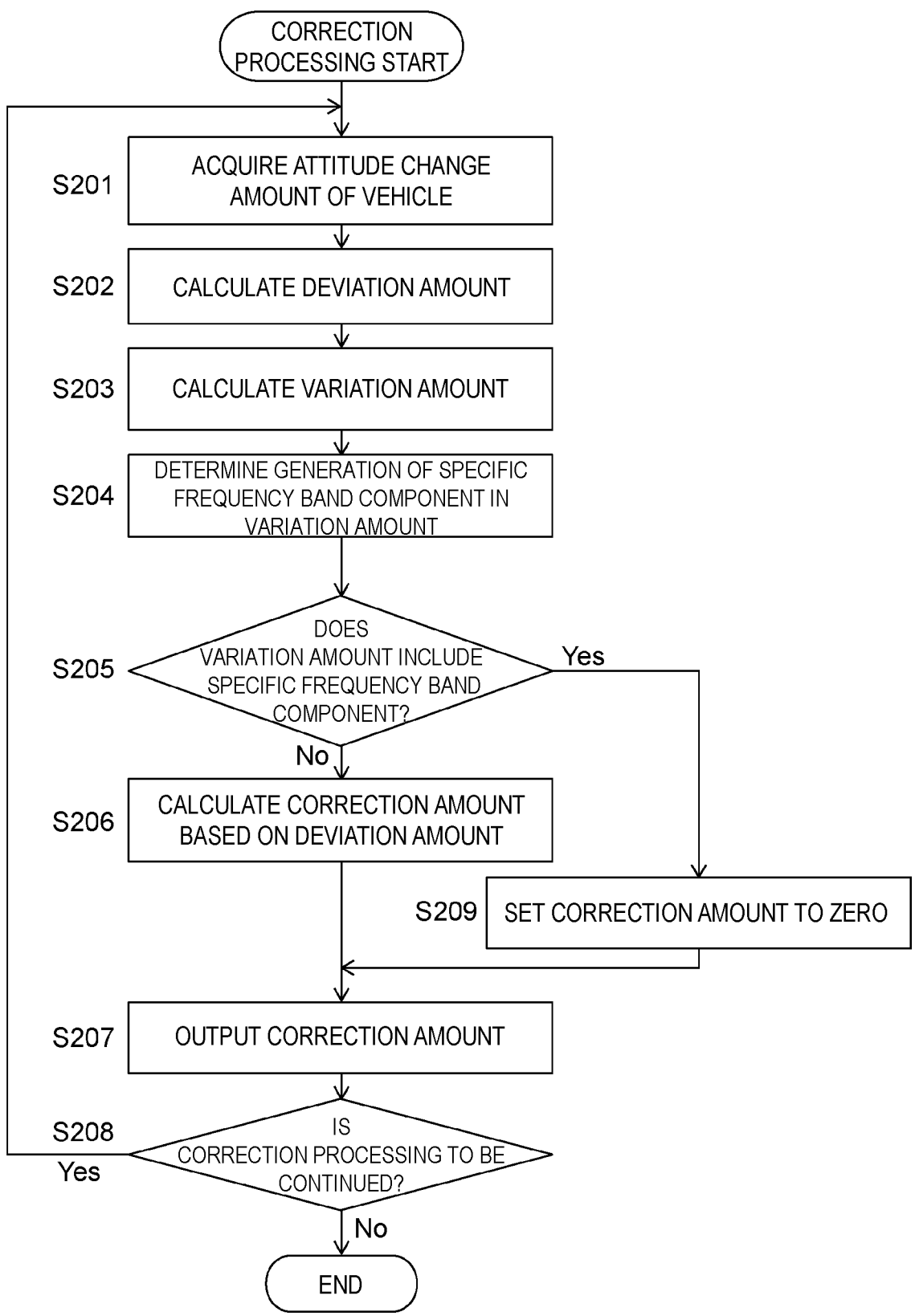
FIG. 6 is a flowchart showing correction processing in a first embodiment.

FIG. 6 shows correction processing performed by the correction controller 52 of the correction processing device 50. The correction processing shown in FIG. 6 is started, for example, when the engine of the vehicle 200 is started, or when a button for instructing the start of the display of the virtual image Iv is operated. The correction processing in FIG. 6 is started together with the display processing in FIG. 5, for example. It should be noted that the correction processing shown in FIG. 6 may be started when a button for instructing the start of the position correction of the virtual image Iv is operated.

The correction controller 52 acquires the attitude change amount indicating the angular velocity output from the gyro sensor 41 (S201). The deviation amount calculator 52a of the correction controller 52 calculates the attitude of the vehicle 200, for example, the deviation amount being an angle with respect to the pitch direction, based on the acquired attitude change amount (S202). Specifically, the deviation amount calculator 52a calculates the pitch angle of the vehicle 200 by performing integration operation on the angular velocity. The calculated deviation amount is sent to the correction amount calculator 52b.

The variation amount calculator 52m of the vibration detector 52c of the correction controller 52 calculates the attitude of the vehicle 200, for example, the variation amount being an angle with respect to the pitch direction, based on the acquired attitude change amount (S203). Specifically, the variation amount calculator 52m calculates the pitch angle of the vehicle 200 by performing integration operation on the angular velocity. The calculated variation amount is sent to the offset removal filter 52e.

Figure 7A:
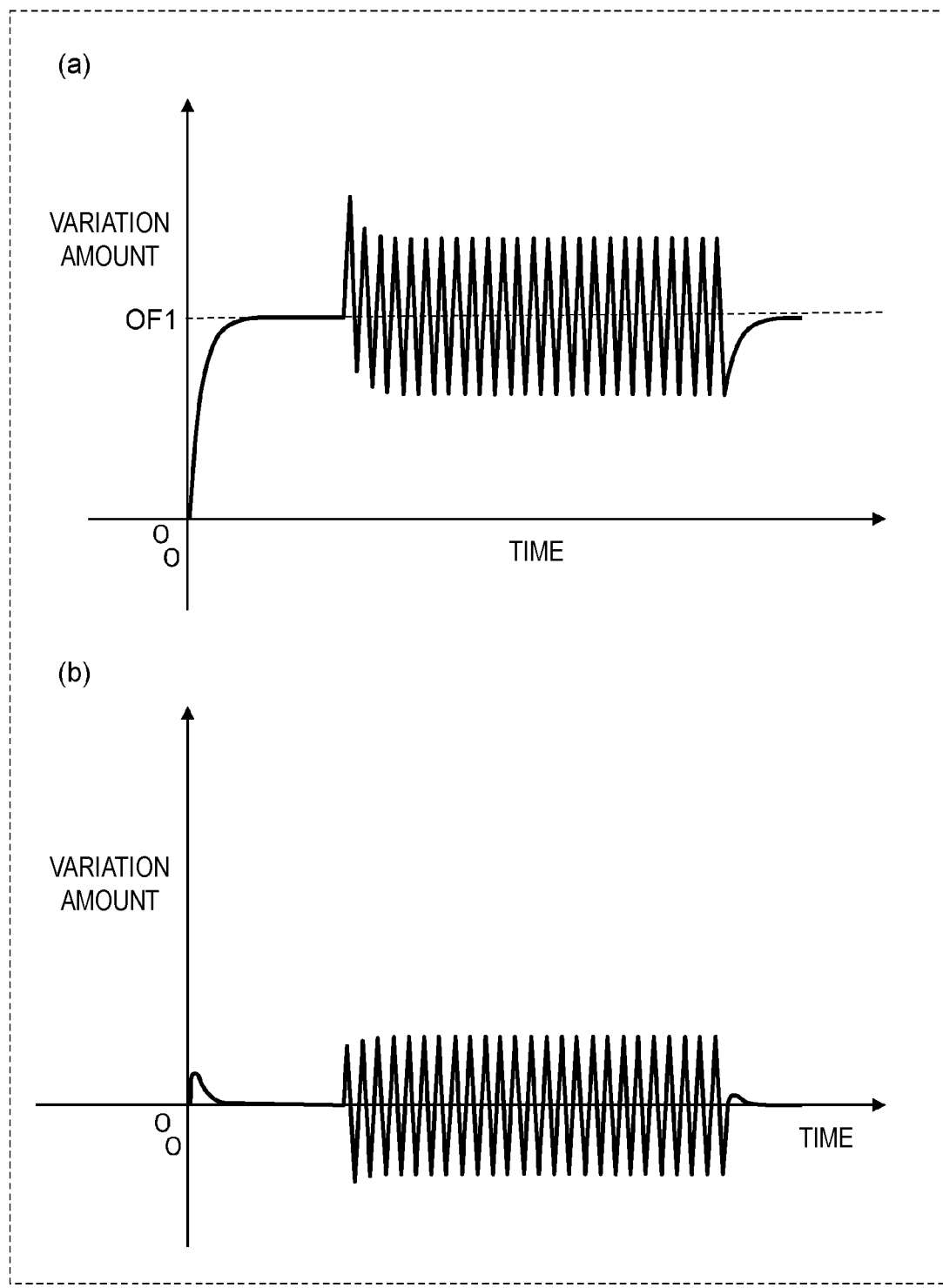
FIGS. 7A(a) and 7A(b) are explanatory diagrams showing an effect of an offset removal filter, FIG. 7A(a) is an explanatory diagram showing an offset error of a variation amount, and FIG. 7A(b) is an explanatory diagram showing a variation amount from which the offset error is removed.

The offset removal filter 52e of the vibration detector 52c removes the offset component of the detected variation amount, and as a result, the low frequency band component of the variation amount is also attenuated. For example, when the variation amount varies as shown in FIG. 7A(a), the offset removal filter 52e removes the offset component OF1 included in the variation amount, whereby the variation amount that vibrates with the 0 value as the center of the amplitude as shown in FIG. 7A(b) can be obtained. The variation amount obtained by removing the offset component OF1 and attenuating the low frequency band component is sent to the threshold value cross detector 52f. It should be noted that the offset removal filter 52e may first remove the offset component from the attitude change amount acquired by the vibration detector 52c from the attitude detection device 40, and then the variation amount calculator 52m may calculate the variation amount from the attitude change amount from which the offset has been removed.

Figure 7B:
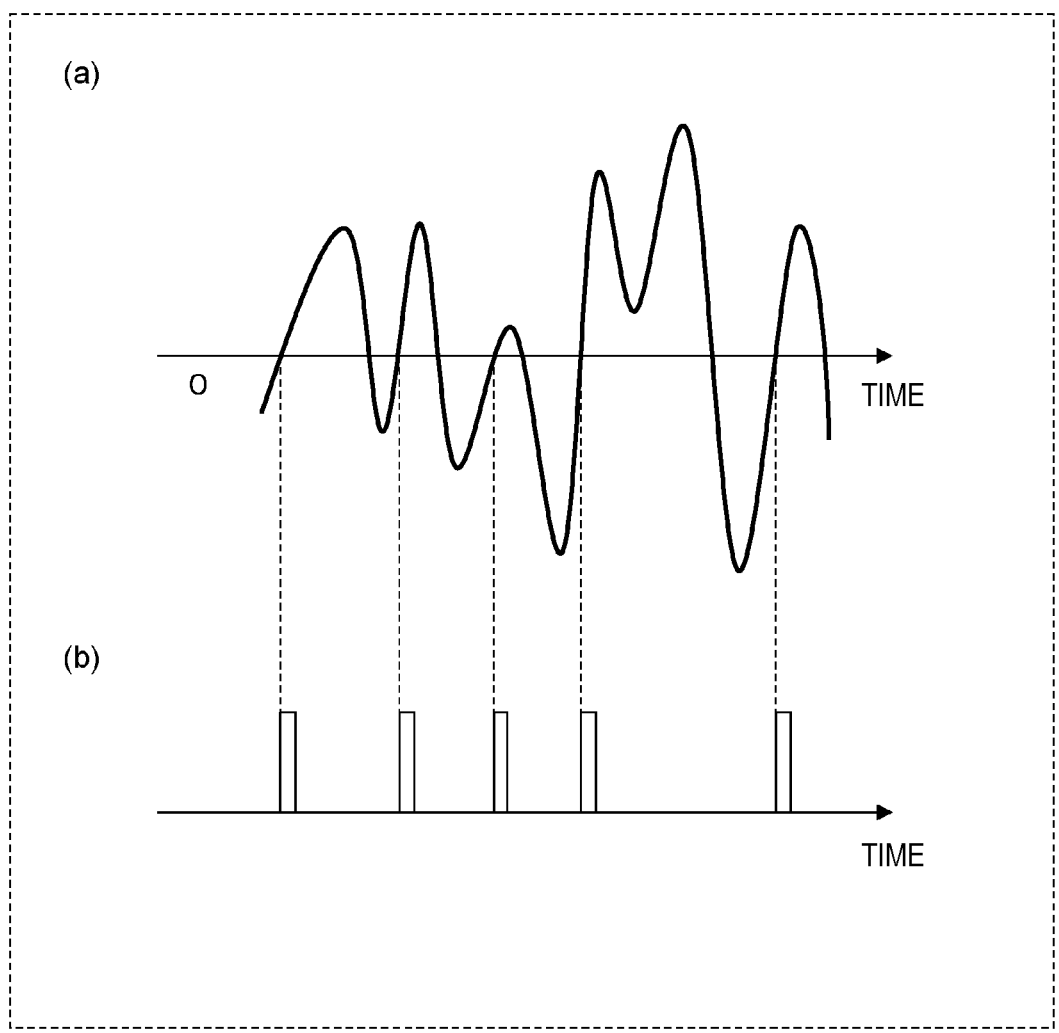
FIGS. 7B(a) and 7B(b) are explanatory diagrams showing an example of counting, FIG. 7B(a) is an explanatory diagram showing an example of vibration of a variation amount, and FIG. 7B(b) is an explanatory diagram showing a counted flag.

The threshold value cross detector 52f detects that the input variation amount has crossed a predetermined threshold value. For example, when the variation amount varies as shown in FIG. 7B(a), the threshold value cross detector 52f detects that, for example, the variation amount has changed from less than the zero value being the threshold value to the zero value or more, and outputs a detection signal to the counter 52g as shown in FIG. 7B(b). It should be noted that the threshold value cross detector 52f may halve the detection cycle, and may also count a decrease change from the zero value or more to less than the zero value in addition to an increase change in the variation amount from less than the zero value being the threshold value to the zero value or more.

The counter 52g measures the number of detection signals to be input during a predetermined period. The predetermined period may be, for example, in the form of a time window, or may be the most recent predetermined time.

The vibration determiner 52h determines whether a component in a specific frequency band is generated in the variation amount (S204). The vibration determiner 52h determines whether or not a specific frequency band component is included in the variation amount, for example, by comparing the number of times the variation amount has crossed the threshold value within a predetermined period with the count threshold value. The vibration determiner 52h compares the number of times the counter 52g has counted with the count threshold value.

If determining that the number of times counted by the counter 52g is smaller than the count threshold value, the vibration determiner 52h determines that a specific frequency band component is not included in the variation amount for a certain period of time or more, and recognizes that vibration at the specific frequency is not included in the vibration of the vehicle 200 based on the determination result (No in S205). In this case, the vibration determiner 52h sends an instruction to cause the correction amount calculator 52b to calculate the correction amount.

The correction amount calculator 52b calculates the correction amount C of the display position of the virtual image Iv based on the deviation amount. Specifically, the correction amount calculator 52b converts the deviation amount of the vehicle 200 into the number of pixels, and determines such a correction amount C as offsets the deviation amount indicated by the number of pixels.

In the present embodiment, the correction amount C is defined as "correction amount C=−(deviation amount at the current time point)+(deviation amount at the time of zero reset)". Hereinafter, the deviation amount at the time of zero reset is also referred to as a deviation offset value. The initial value of the deviation offset value is, for example, zero. The deviation offset value is a deviation amount detected in an attitude state serving as a reference of the moving body. In the calculation of the correction amount in step S206, the deviation amount calculator 52a may calculate "−attitude (angle) at the current time point+deviation offset value (angle)" in units of angles and output the calculated value to the correction amount calculator 52b, and the correction amount calculator 52b may convert the input value into the number of pixels. In addition, the deviation amount calculator 52a may output the attitude (angle) at the current time point to the correction amount calculator 52b, and the correction amount calculator 52b may convert the attitude (angle) into the number of pixels and then calculate "−deviation amount (the number of pixels) at the current time point+deviation offset value (the number of pixels)".

The correction controller 52 outputs the correction amount C calculated by the correction amount calculator 52b to the display processing device 30 (S207). Accordingly, the display processing device 30 causes the projection device 10 to display the virtual image Iv based on the reference position P0 and the correction amount C, and the virtual image Iv is displayed at the position indicated by "reference position P0+correction amount C".

If determining that the number of times counted by the counter 52g is the count threshold value or more in step S205, the vibration determiner 52h recognizes that the variation amount includes vibration at the specific frequency (Yes in S205). In this case, a signal indicating that the variation amount includes vibration at a specific frequency is sent to the correction amount adjuster 52d.

Figure 8A:
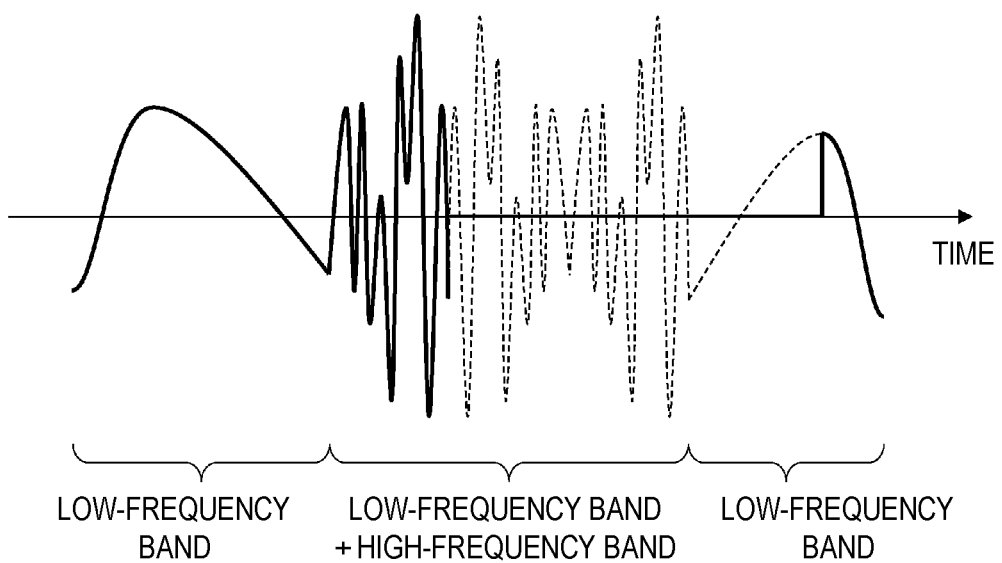
FIG. 8A is an explanatory diagram showing an example of resetting a correction amount to zero.

When a signal indicating that vibration at a specific frequency is included in the variation amount is sent from the vibration determiner 52h, the correction amount adjuster 52d sets the correction amount C to zero (S209). Specifically, for example, the deviation amount calculator 52a sets the deviation offset value (angle) to "deviation offset value (angle)=attitude (angle)". Accordingly, the angle indicated by "−attitude (angle)+deviation offset value (angle)", that is, 0 degrees is output from the deviation amount calculator 52a to the correction amount calculator 52b. Alternatively, the correction amount calculator 52b converts the attitude change amount (angle) calculated by the deviation amount calculator 52a into the number of pixels (the number of deviation pixels), and sets the deviation offset value (the number of pixels) to "deviation offset value (the number of pixels)=the number of deviation pixels". Accordingly, the correction amount C calculated by "−deviation amount (the number of pixels)+deviation offset value (the number of pixels)" becomes zero. The correction controller 52 outputs the correction amount C set to 0 by the correction amount calculator 52b to the display processing device 30 (S207). FIG. 8A is an explanatory diagram illustrating an example of resetting the correction amount C to zero. For example, the correction amount C is immediately reset to zero from when it is determined that the variation amount includes a component of the specific frequency band, and the display position is returned to the reference position P0.

The correction controller 52 determines whether to continue the correction processing (S208). For example, when the engine of the vehicle 200 is stopped, when a button for instructing termination of display of the virtual image Iv is operated, or the like, the correction controller 52 terminates the correction processing. If the correction processing is continued, the process returns to step S201.

As described above, in the present embodiment, when a component of the specific frequency band is generated in the variation amount, the correction amount C is set to zero by setting the deviation offset value to "deviation offset value=deviation amount". In other words, when a component of the specific frequency band is generated in the variation amount, the display position is reset to the reference position P0.

4. Effects, Supplements, and the Like

A vibration detection system 60 of the present disclosure includes: an attitude detection device 40 that detects an attitude change amount of a vehicle 200, a threshold value cross detector 52f that detects that a variation amount calculated based on the attitude change amount has crossed a predetermined threshold value, a counter 52g that measures the number of times the variation amount has crossed the threshold value in a unit time, and a vibration determiner 52h that determines whether a specific frequency band component is included for a certain period of time or more in the attitude change in the vehicle 200 based on the number of times measured by the counter 52g.

Since the frequency band and the amplitude of vibration generated in the vehicle 200 vary depending on the situation of the traveling path, for example, when it is determined whether vibration having a specific frequency band component has been generated for a certain period of time or more by filter processing of a high-pass filter, a low-pass filter, a band-pass filter, and the like, the amplitude of vibration needs to be included in a determination criterion. However, it is difficult to predict the amplitude of the vibration, and it is difficult to set an optimum threshold value of the filter processing. On the other hand, according to the present disclosure, since the high-frequency band component included in the variation amount is detected by the counter value, the amplitude of vibration does not need to be included in the determination criterion, and the high-frequency band component can be accurately detected.

In addition, the display system 100 of the present disclosure includes: a display processing device 30 that controls display of a virtual image, an attitude detection device 40 that detects an attitude change amount of the vehicle 200, and a correction processing device 50 that includes s vibration detector 52c that determines whether an attitude change in the vehicle 200 having a specific frequency band component has been continuously generated for a certain period of time or more based on the attitude change amount of the vehicle 200. The correction processing device 50 updates a correction amount C of a display position of the virtual image Iv based on the attitude change amount when the vibration detector 52c determines that an attitude change in the vehicle 200 having a specific frequency band component has not been continuously generated for a certain period of time or more. When the vibration determiner 52c determines that an attitude change in the vehicle 200 having a specific frequency band component has been continuously generated for a certain period of time or more, the correction processing device 50 sets the sign of the correction amount C to be the same as the sign of the correction amount C at the last determination, and sets the absolute value of the correction amount C to be equal to or less than the absolute value of the correction amount C at the last determination. In addition, the vibration detector 52c includes: a threshold value cross detector 52f configured to detect that the attitude change amount or a variation amount calculated based on the attitude change amount has crossed a predetermined threshold value, a counter 52g configured to measure the number of times the attitude change amount or the variation amount has crossed the threshold value in a unit time, and a vibration determiner 52h configured to determine that an attitude change in the vehicle 200 having the specific frequency band component has been continuously generated for a certain period of time or more when the number of times measured by the counter 52g is a count threshold value or more. The display processing device 30 controls a display position of the virtual image based on the correction amount C.

Figure 8B:
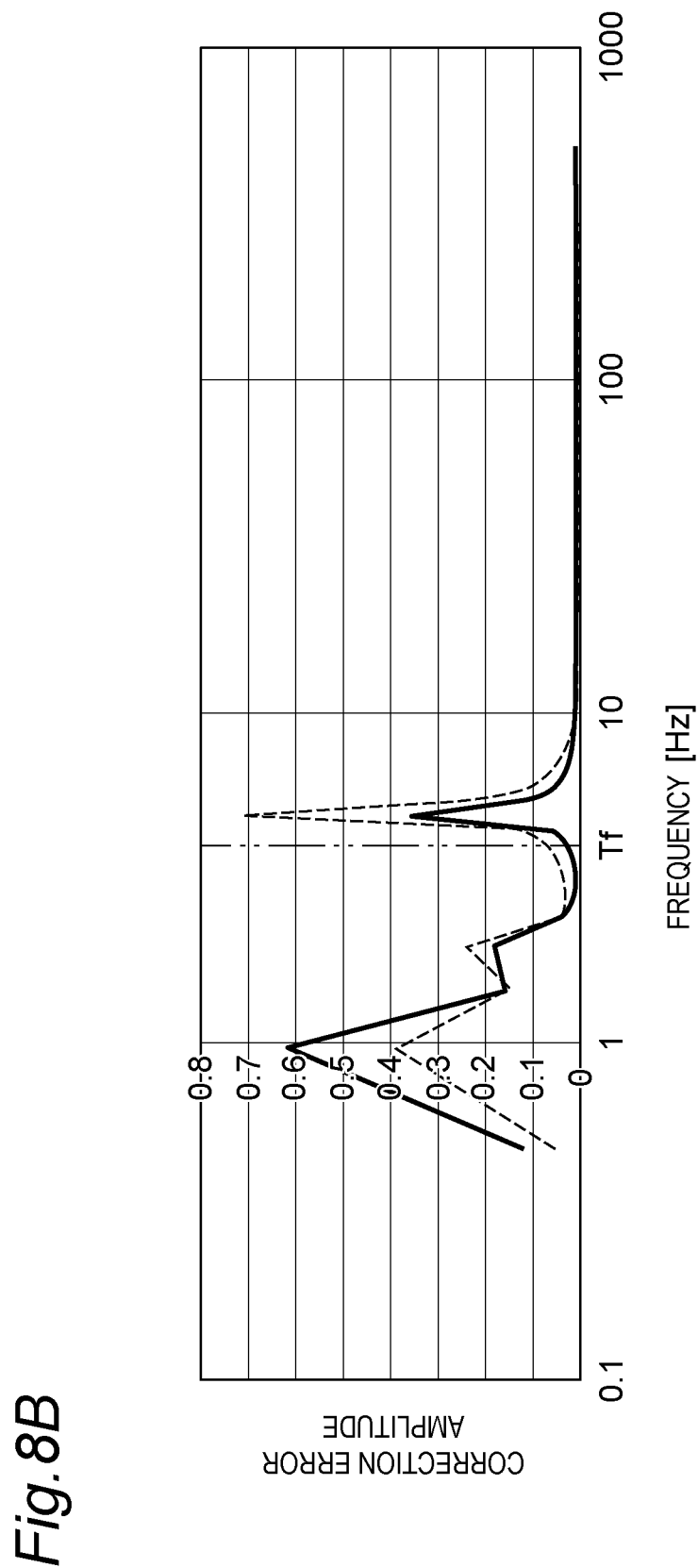
FIG. 8B is a graph showing an effect of detection of a specific frequency.

Accordingly, it is possible to suppress the enlargement of the display deviation due to the attitude change in the vehicle 200 having a specific frequency band component, and to appropriately display the virtual image Iv. When the attitude change in the vehicle 200 is continuously generated for a certain period of time or more, the vibration of the correction amount corresponding to the attitude change amount of the vehicle 200 is adjusted, and thus, it is possible to suppress the discomfort and the false recognition felt by the occupant D by the vibration of the high-frequency component being increased and displayed by the correction. FIG. 8B is an explanatory diagram showing an effect of correction by specific frequency detection in frequency characteristics. In FIG. 8B, the solid line graph indicates the correction error amount of the display deviation when the correction amount is adjusted by the vibration detection of the specific frequency band, and the broken line graph indicates the correction error amount of the display deviation when the correction amount is not adjusted by the vibration detection of the specific frequency band. In FIG. 8B, the horizontal axis is a logarithmic scale. As shown in FIG. 8B, for example, the error correction amplitude of the display deviation at the specific frequency generated in the vicinity of 5 Hz higher than the threshold value Tf being the lower limit F of the frequency band of Inequality (1) decreases.

Figure 8C:
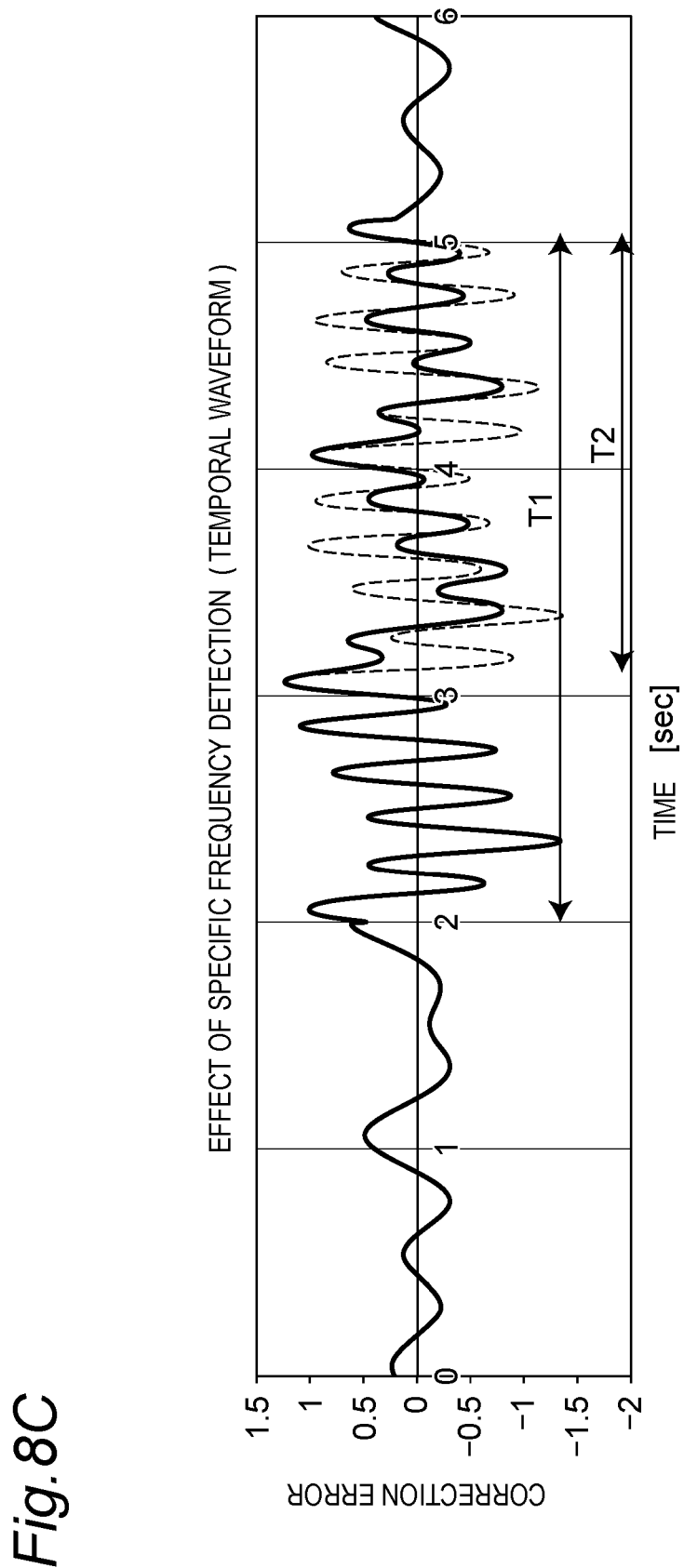
FIG. 8C is a graph showing a variation of a correction error.

FIG. 8C is an explanatory diagram showing an effect of correction by specific frequency detection in a temporal waveform. FIG. 8C shows a period T1 in which the specific frequency component is generated and a period T2 in which the specific frequency component is detected. The broken line graph indicates the correction error amount of the display deviation when the correction amount is not adjusted by the vibration detection of the specific frequency band, and the solid line graph indicates the correction error amount of the display deviation when the correction amount is adjusted by the vibration detection of the specific frequency band. Compared with when the correction amount is not adjusted by the vibration detection, the correction error amount of the display deviation in the period T2 is reduced when the correction amount is adjusted by the vibration detection.

In addition, since the vibration detector 52c detects that the variation amount includes a high-frequency band component by the counter value, the amplitude of vibration does not need to be included in the determination criterion, and it is possible to accurately detect that the variation amount includes a high-frequency band component.

In addition, the correction processing device 50 includes: a correction amount calculator 52b configured to calculate a correction amount of a display position of the virtual image based on the attitude change amount, and a correction amount adjuster 52d configured to adjust the correction amount. The vibration detector 52c includes a variation amount calculator 52m configured to calculate the variation amount based on the attitude change amount. The correction amount adjuster 52d adjusts the correction amount based on a determination result of the vibration determiner 52h.

In addition, by setting the correction amount C to zero while the high-frequency vibration is generated in the vehicle 200, the display deviation corresponding to the vibration of the vehicle occurs, but it is possible to prevent the display deviation from enlarging. That is, when the vibration (deviation) of the virtual image Iv with respect to the outside view is corrected, and when the delay time from the correction amount calculation to the display is large, it is possible to prevent the display deviation from increasing conversely by performing the correction. Accordingly, it is possible to prevent enlargement of the display deviation caused by high-frequency vibration that greatly affects the display quality of the virtual image, such as deterioration in visibility and increase in discomfort.

In addition, since the vibration detector 52c includes an offset removal filter 52e set to the cutoff frequency lower than the specific frequency band of the variation amount, it is possible to suppress the influence of the offset error of the variation amount and to improve the detection accuracy of the high-frequency band component.

In addition, the display system 100 of the present embodiment further includes a projection device 10 that projects light representing a virtual image. In the present embodiment, the moving body is a vehicle, and the image is a virtual image to be displayed in front of a windshield of a vehicle. According to the present embodiment, it is possible to suppress the enlargement of the correction deviation of the display position of the virtual image due to the road surface state of the traveling path.

It should be noted that in step S209, a method of setting the correction amount C to zero is optional. In the present embodiment, the correction amount C is set to "correction amount C=−deviation amount+offset value", but the correction amount C may be set to "correction amount C=−deviation amount". In this case, the correction amount C is set to zero by setting the deviation amount itself to zero. Specifically, when the vehicle attitude is calculated based on the output of the gyro sensor 41, the integral amount of the angular velocity calculated by the deviation amount calculator 52a is set to zero.

As described above, since the correction processing device 50 sets the correction amount C to zero, the virtual image Iv is kept at a fixed position. The position of the virtual image Iv generates the display deviation corresponding to the vibration of the vehicle, but the display deviation is not enlarged by the correction, and thus it is possible to prevent the occupant D from feeling fatigue without seeing a steep vibration change in the display positional deviation of the virtual image Iv. That is, it is possible to suppress the enlargement of the display deviation caused by the high-frequency vibration that greatly affects the display quality of the virtual image, and to suppress the discomfort in appearance due to the vibration of the display position.

In addition, in step S209 in FIG. 6, instead of setting the correction amount C to zero, the magnitude of the correction amount C may be reduced by a predetermined amount so as not to become zero. In this case, the correction processing device 50 may reduce the magnitude of the correction amount C by a predetermined amount (a value smaller than the correction amount C) so that the magnitude of the correction amount C does not become zero. Specifically, for example, the correction amount calculator 52b sets the offset value to "offset value=predetermined amount" in "correction amount C=−(deviation amount−offset value)". The predetermined amount may be set according to the display position in the display area 220 of the virtual image Iv. In addition, the correction amount C may be stepwise reduced. It should be noted that the number of times of reduction may be three or more, or the offset value may be changed depending on the number of times. Accordingly, it is possible to reduce the discomfort in appearance by further suppressing the change in the display position of the virtual image Iv rather than setting the correction amount C suddenly to zero.

Second Embodiment

In the first embodiment, when a component in a specific frequency band is included in the variation amount, the correction amount C is set to zero. In the second embodiment, when a component in a specific frequency band is included in the variation amount, the update of the correction amount C is stopped. Therefore, in the second embodiment, when the vibration determiner 52h determines that an attitude change in the vehicle 200 having a specific frequency band component has been continuously generated for a certain period of time or more, the correction amount adjuster 52d sets the sign of the correction amount to be the same as the sign of the correction amount at the last determination and maintains the absolute value of the correction amount to be the same value as the correction amount at the last determination.

Figure 9:
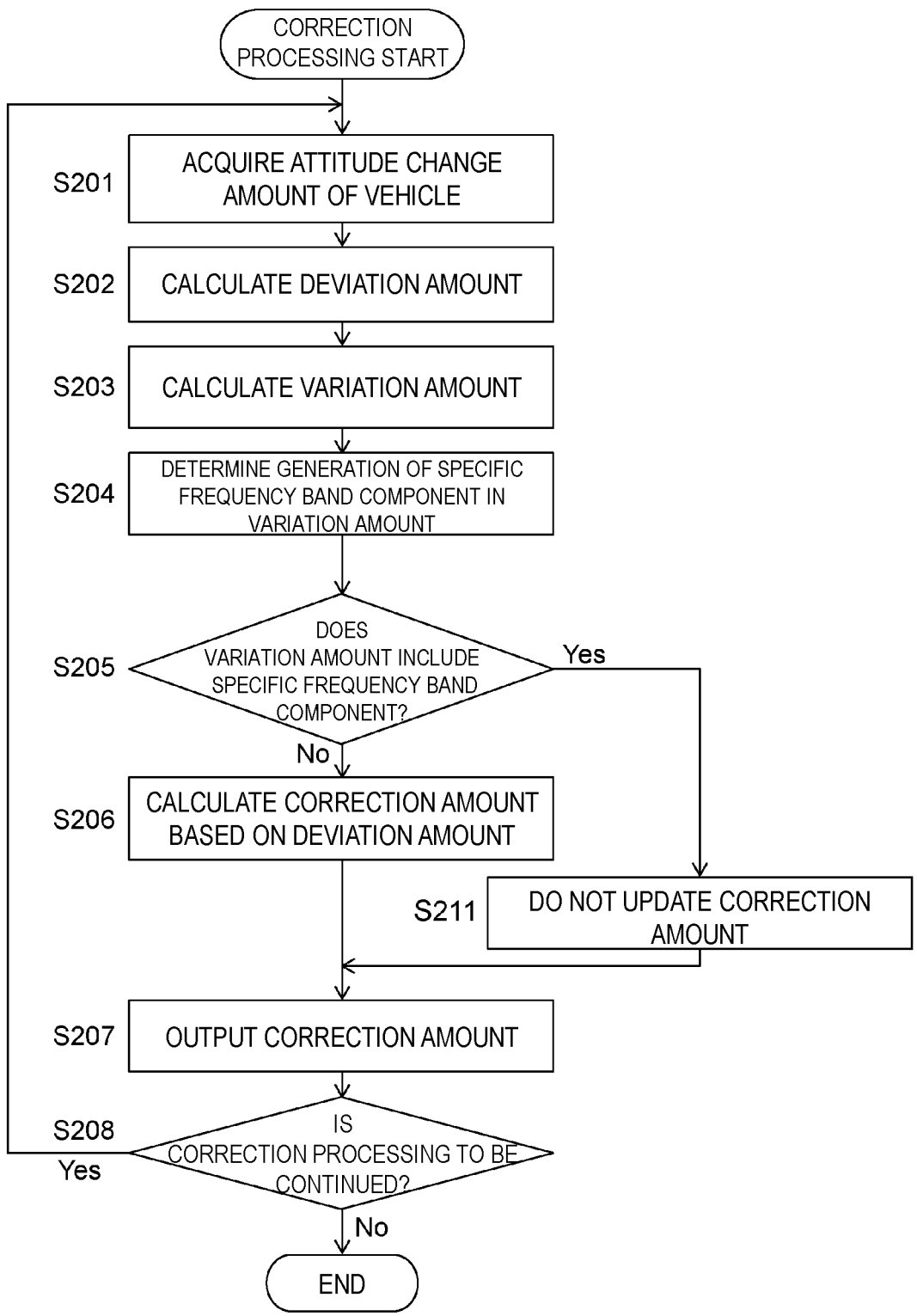
FIG. 9 is a flowchart showing correction processing in a second embodiment.

FIG. 9 is a flowchart showing a flow of correction processing in the second embodiment. Steps S201 to S207 in FIG. 9 of the second embodiment are the same as those of the first embodiment. In the second embodiment, steps S201 to S204 are performed similarly to the first embodiment.

Figure 10:
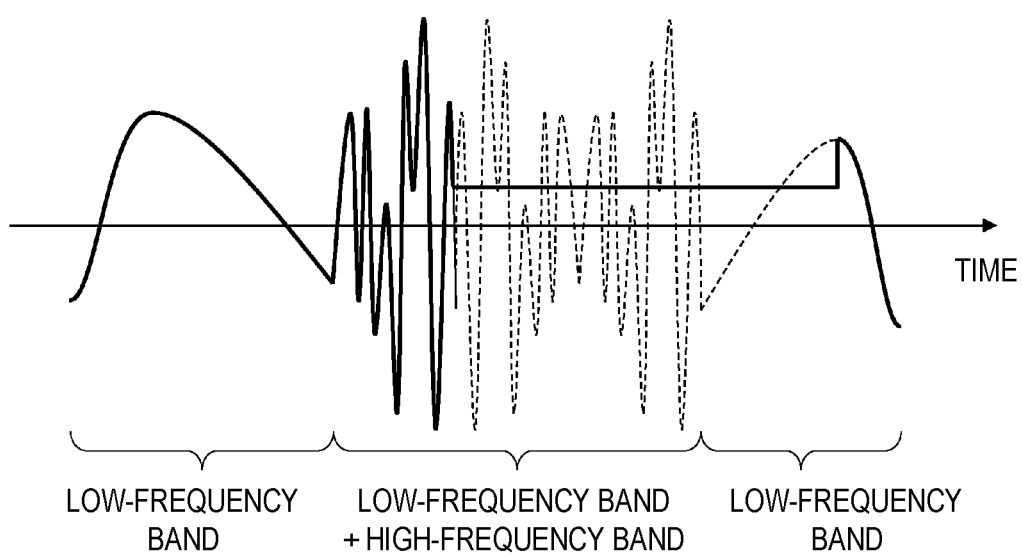
FIG. 10 is an explanatory diagram showing an example in which the correction amount is not updated.

In the second embodiment, if a component in a specific frequency band is included in the variation amount (Yes in S205), the correction amount adjuster 52d does not update the correction amount C with the correction amount calculated by the correction amount calculator 52b (S211). Therefore, as shown in FIG. 10, the sign of the correction amount C is the same as the sign of the correction amount at the last determination, and the absolute value of the correction amount C is maintained at the same value as the correction amount at the last determination. That is, the correction amount C when it is determined that a component of a specific frequency (high-frequency) band is included is maintained. When it is determined that a component in a specific frequency band is not included, since the calculated correction amount C is output, the display position of the virtual image Iv deviated by the vibration of the vehicle 200 is corrected. Thereafter, steps S207 and S208 are performed similarly to the first embodiment.

As described above, even when a component in a specific frequency band is detected in the variation amount, the display position of the virtual image Iv does not rapidly move to the reference position, so that discomfort in appearance can be reduced. In addition, when the vehicle 200 is in vibration at a specific frequency, since the display position of the virtual image Iv is fixed, the deviation amount of the display position does not change, and thus, it is possible to reduce the viewer's fatigue.

Third Embodiment

In the first embodiment, when a component in a specific frequency band is included in the variation amount, the correction amount C is set to zero. In the third embodiment, when a component in a specific frequency band is included in the variation amount, the amplitude of the correction amount C can be further reduced by multiplying the correction amount by a coefficient and updating the correction amount. Therefore, in the third embodiment, when the vibration determiner 52h determines that an attitude change in the vehicle 200 having a specific frequency band component has been continuously generated for a certain period of time or more, the absolute value of the correction amount is set to a value smaller than the absolute value of the correction amount at the last determination.

Figure 11:
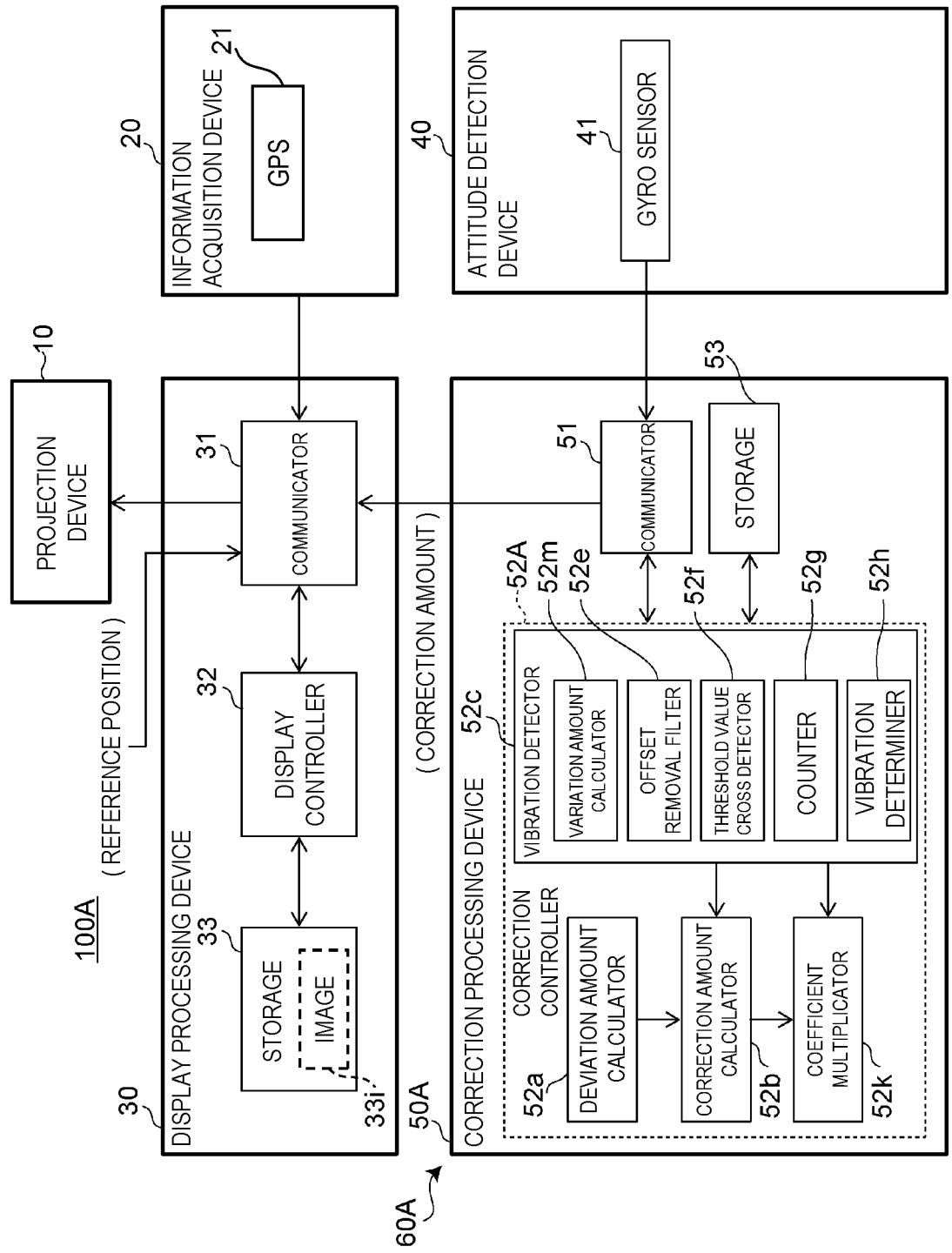
FIG. 11 is a block diagram showing an internal configuration of a display system in a third embodiment.

FIG. 11 is a block diagram showing an internal configuration of a display system 100A in the third embodiment. A display system 100A in the third embodiment has a configuration in which a coefficient multiplicator 52k as a correction amount adjuster is added to the correction controller 52 of the correction processing device 50 in the display system 100 in the first embodiment. Regarding the configuration other than this respect and the respects described below, the display system 100A in the third embodiment and the display system 100 in the first embodiment are the same.

Figure 12:
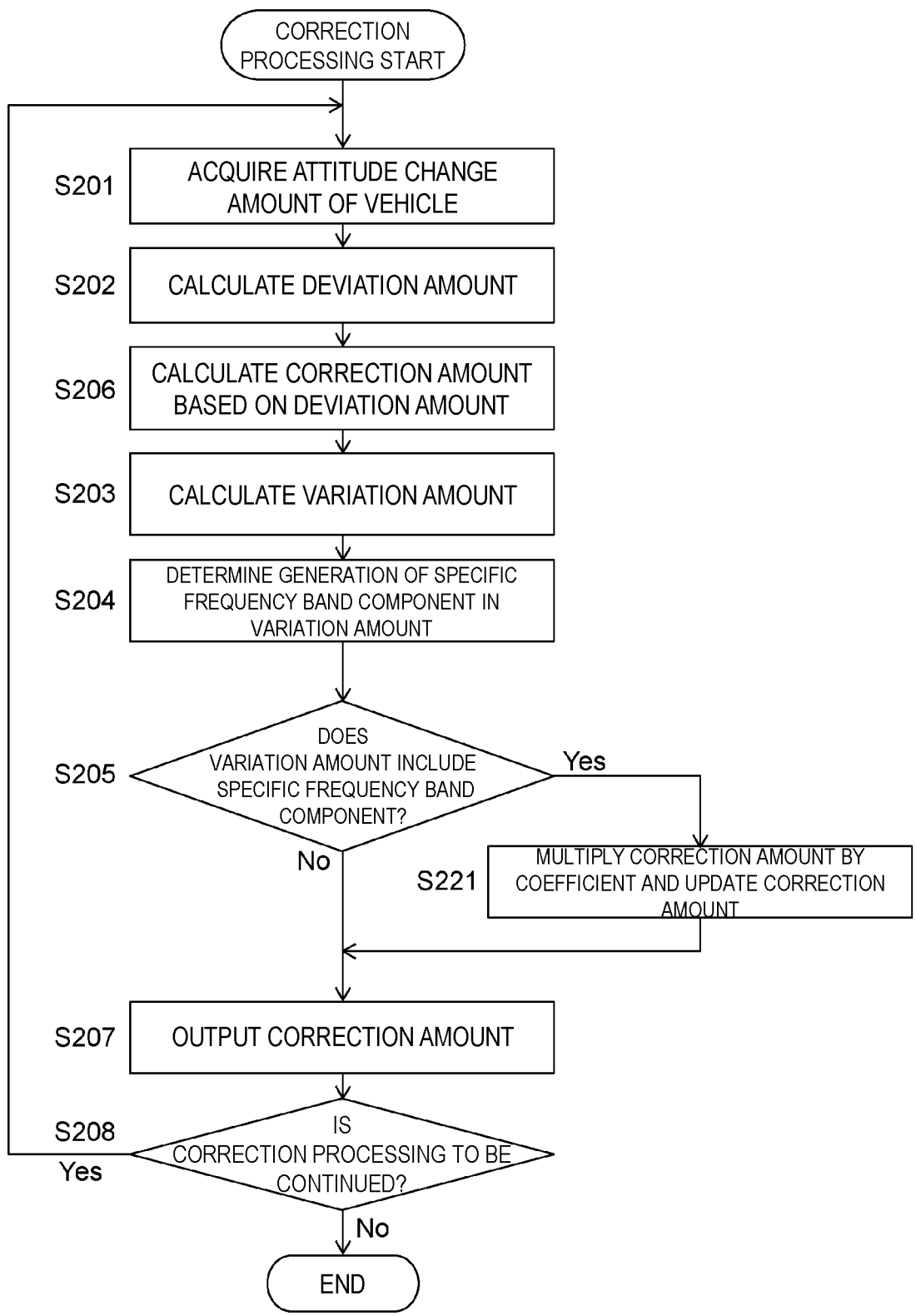
FIG. 12 is a flowchart showing correction processing in the third embodiment.

FIG. 12 shows correction processing in the third embodiment. Steps S201 to S208 in FIG. 12 of the third embodiment are the same as steps S201 to S208 in FIG. 11 of the first embodiment. In the third embodiment, steps S201 and S202 are performed similarly to the first embodiment. FIG. 12 shows the correction amount calculation in step S206 between the deviation amount calculation in step S202 and the variation amount calculation in step S203, but step S206 and the calculation to determination of the variation amount in steps S203 to S205 can be performed in parallel.

In the third embodiment, if vibration at a specific frequency is generated in the variation amount (Yes in S205), the coefficient multiplicator 52k multiplies the calculated correction amount by a coefficient to update the correction amount. The coefficient is a number greater than 0 and less than 1, and for example, 0.5. Accordingly, while the variation amount includes a component in a specific frequency band, the amplitude of the display position of the virtual image Iv to be corrected is reduced, so that the vibration of the virtual image Iv can be made less conspicuous. Thereafter, steps S207 and S208 are performed similarly to the first embodiment. It should be noted that the coefficient multiplicator 52k may multiply the calculated deviation amount by a coefficient instead of multiplying the calculated correction amount by a coefficient. In this case, the correction amount calculator 52b calculates the correction amount corresponding to the deviation amount obtained by having been multiplied by a coefficient and having resulted in a small value.

In addition, in the case of Yes in step S205, the coefficient multiplicator 52k may update the correction amount by multiplying the correction amount at the last determination by the vibration determiner 52h by a coefficient greater than 0 and less than 1. Accordingly, while the variation amount includes a component in a specific frequency band, the amplitude of the display position of the virtual image Iv to be corrected is reduced, so that the vibration of the virtual image Iv can be made less conspicuous.

In addition, in the case of Yes in step S205, the coefficient multiplicator 52k may update a value having the same sign as the sign of the correction amount at the last determination by the vibration determiner 52h, the value obtained by multiplying the absolute value of the correction amount at the last determination by a coefficient greater than 0 and less than 1, as the current correction amount. Therefore, when the vibration determiner 52h determines that an attitude change in the vehicle 200 having a specific frequency band component has been continuously generated for a certain period of time or more, the correction controller 52A sets the sign of the correction amount to be the same as the sign of the correction amount at the last determination, and sets the absolute value of the correction amount to a value less than the absolute value of the correction amount at the last determination. Accordingly, while the variation amount includes a component in a specific frequency band, the amplitude of the display position of the virtual image Iv to be corrected is significantly reduced, and the vibration of the virtual image Iv can be made less conspicuous.

Fourth Embodiment

In the first embodiment, vibration of a specific frequency of the vehicle 200 is detected, and the variation amount is corrected according to the vibration. However, the fourth embodiment is not limited to be applied to a moving body such as the vehicle 200, and may be applied to a movable body that performs attitude change or vibration on the spot. The moving body also includes a displaceable movable body that moves on the spot. Examples of such a movable body include a digital camera to be displaced by a user's camera shake, and the vibration detection system 60 of the fourth embodiment detects vibration of this movable body 300.

Figure 13:
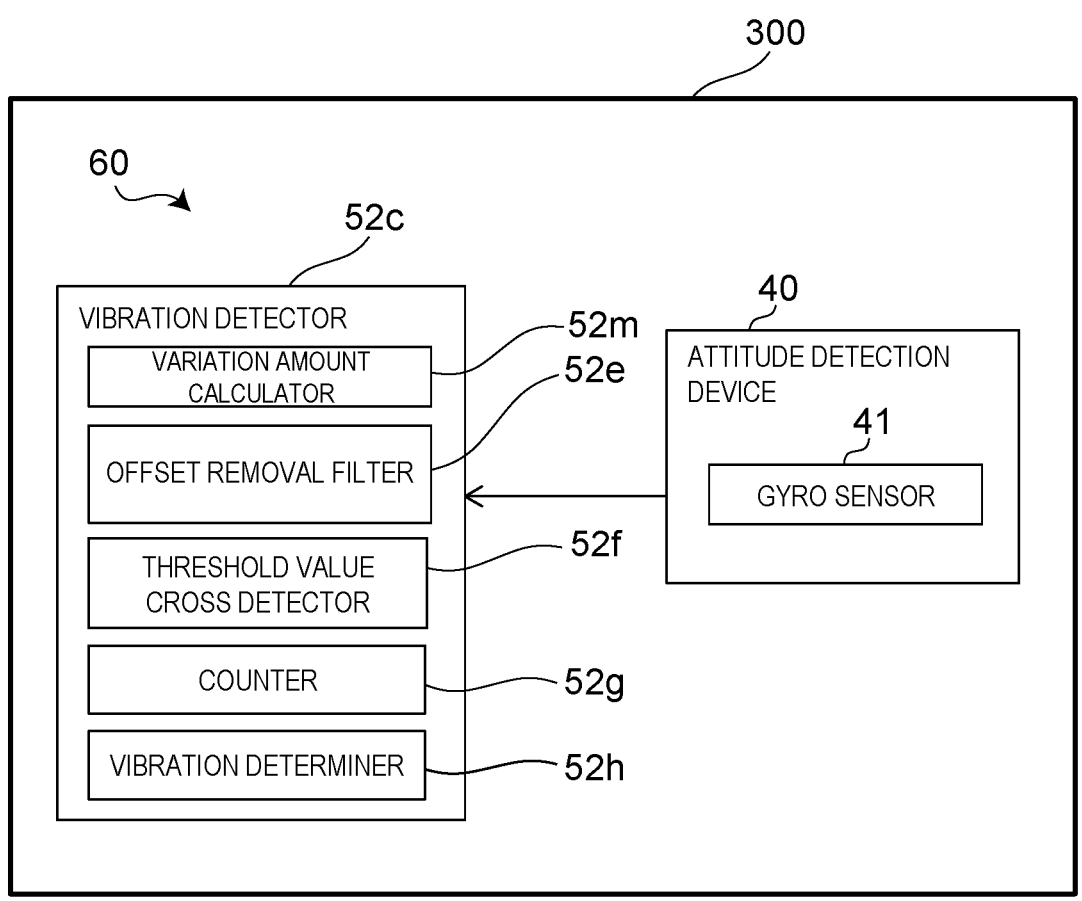
FIG. 13 is a block diagram showing a configuration of a vibration detection system in a fourth embodiment.

FIG. 13 is a block diagram showing a configuration of a vibration detection system 60 in the fourth embodiment. The movable body 300 includes a vibration detection system 60. The vibration detection system 60 includes an attitude detection device 40 and a vibration detector 52c. The configurations of the attitude detection device 40 and the vibration detector 52c are similar to those of the first embodiment, and thus description thereof will be omitted. It should be noted that examples of the movable body 300 include an imaging unit, and in addition to a digital camera, an onboard camera.

According to the vibration detection system 60 of the fourth embodiment, since it is possible to accurately detect vibration in a specific frequency band of the movable body 300, the vibration can be used for vibration correction.

Other Embodiments

As described above, the above embodiments have been described as examples of the technique disclosed in the present application. However, the technique in the present disclosure is not limited to this, and can also be applied to embodiments in which changes, substitutions, additions, omissions, and the like are made as appropriate. Thus, in the following, other embodiments will be exemplified.

Figure 14A:
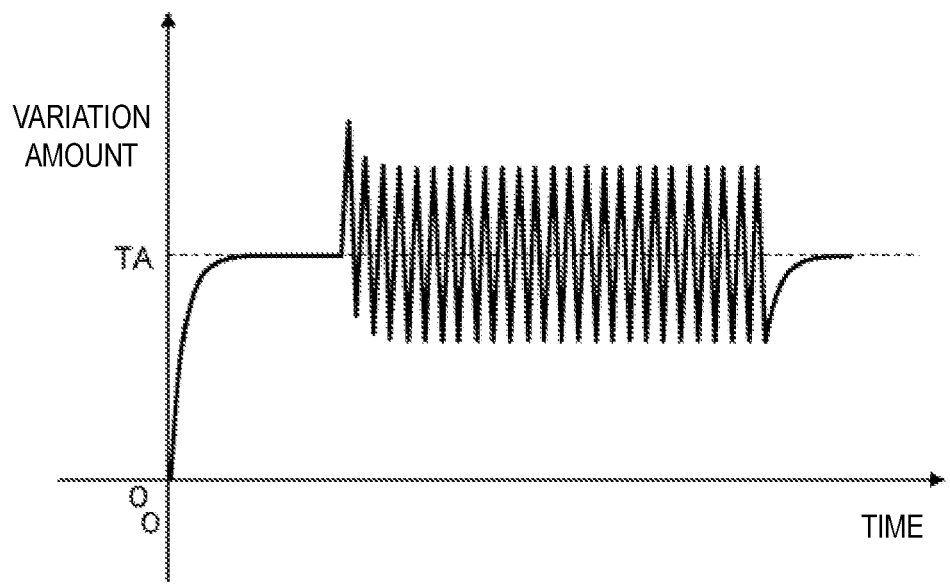
FIGS. 14A and 14B are explanatory diagrams showing an example of counting using threshold values.
Figure 14B:
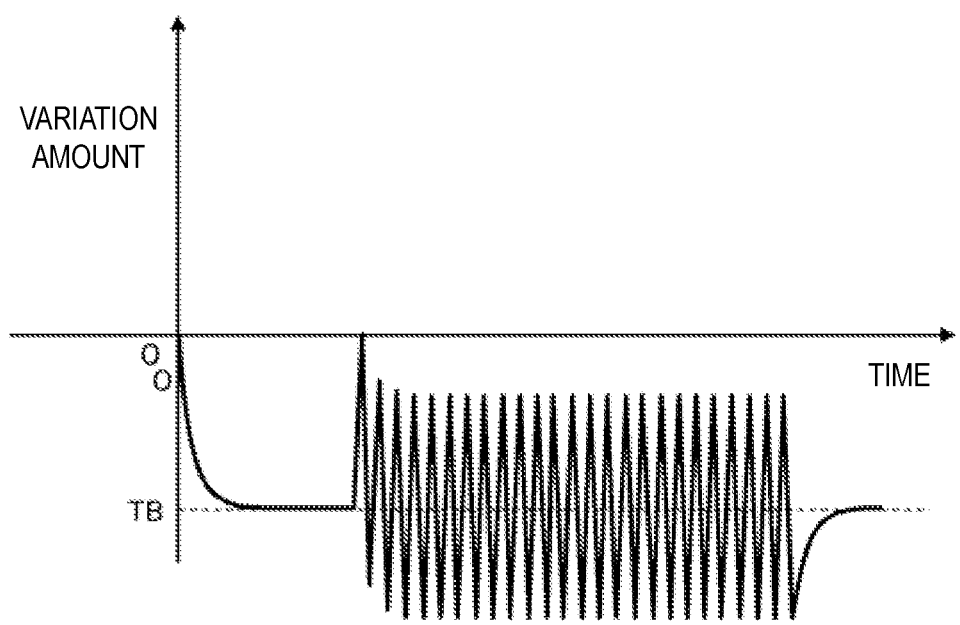

In the above embodiments, the vibration detector 52c includes an offset removal filter 52e, but the offset removal filter 52e may be omitted. In this case, the threshold value cross detector 52f detects that vibration of the variation amount crosses the threshold value in a state where the offset component and the high-frequency component are present in the variation amount. In this case, as shown in FIG. 14A, by setting the threshold value TA to the offset value, it is possible to detect that vibration at a specific frequency is included in the variation amount. In addition, when two threshold values are used, positive and negative signs due to the offset error can be considered even when the offset removal filter 52e is omitted. For example, as shown in FIGS. 14A and 14B, by using the threshold value TA having a positive sign and the threshold value TB having a negative sign, even if a positive or negative offset error occurs in the attitude variation amount in the variation amount, it is possible to detect that the respective threshold values TA and TB are crossed, and it is possible to detect that the variation amount includes a component in a specific frequency band.

Figure 15:
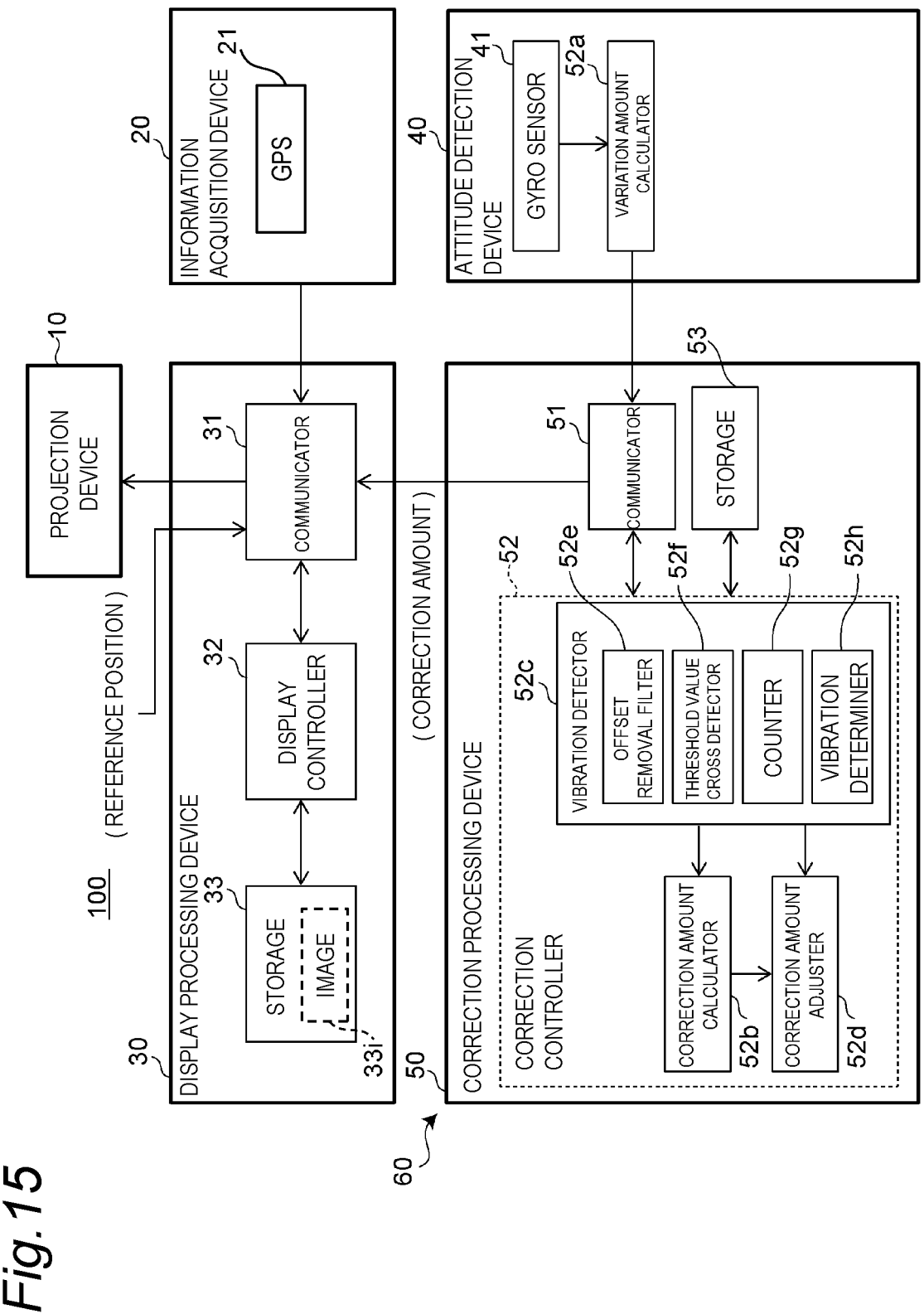
FIG. 15 is a block diagram showing an internal configuration of a display system in a modification.

In the above embodiments, the correction controller 52 includes a deviation amount calculator 52a, and the angular velocity information output from the attitude detection device 40 is integrated into the angle information. However, the present disclosure is not limited to this. As shown in FIG. 15, the attitude detection device 40 may include a deviation amount calculator 52a, and the attitude detection device 40 may transmit the angle information to the correction processing device 50. In addition, when the vibration detector 52c detects vibration in a specific frequency band using the attitude change amount such as the pitch angular velocity, the roll angular velocity, and the yaw angular velocity detected by the gyro sensor 41 as the variation amount as it is, the variation amount calculator 52m may be omitted. In this case, the offset removal filter 52e and the threshold value cross detector 52f perform the respective pieces of processing with the angular velocity information being the attitude change amount as the variation amount.

In addition, when the gyro sensor 41 of the attitude detection device 40 directly detects each of the pitch angle, the roll angle, and the yaw angle, the correction controller 52 may perform processing on the attitude change amount detected by the gyro sensor 41 as the variation amount and the deviation amount as it is. In this case, the variation amount calculator 52m and the deviation amount calculator 52a can be omitted.

In the above embodiments, the number of count threshold values is one, but two count threshold values may be set. The plurality of count threshold values can be used for coping with a case where there is an offset in the deviation amount.

In the above embodiments, the case where each of the projection device 10, the information acquisition device 20, the display processing device 30, the attitude detection device 40, and the correction processing device 50 is a separate device has been exemplified. However, a plurality of devices may be integrally formed as one device. For example, the display processing device 30 and the correction processing device 50 may be integrally formed as one device. The information acquisition device 20 and the display processing device 30 may be integrally formed as one device. The attitude detection device 40 and the correction processing device 50 may be integrally formed as one device. The separately formed devices are communicably connected to each other by wire or wirelessly. It should be noted that all of the projection device 10, the information acquisition device 20, the display processing device 30, the attitude detection device 40, and the correction processing device 50 may be formed as one device. In this case, the communicators 31 and 51 do not need to be provided.

In the above embodiments, an example in which the information acquisition device 20 includes the GPS module 21 has been described. However, the information acquisition device 20 may include a distance sensor that measures a distance and a direction from the vehicle 200 to a surrounding target object, and may output distance information indicating the measured distance and direction to the display processing device 30. The information acquisition device 20 may include a vehicle speed sensor that detects the speed of the vehicle 200, or may include a navigation system. The information acquisition device 20 may include one or more of a GPS module 21, a distance sensor, a camera, an image processing device, an acceleration sensor, a radar, a sound wave sensor, a white line detection device of an advanced driver-assistance systems (ADAS), and the like. In this case, the GPS module 21, the distance sensor, the camera, and the like having a function as the information acquisition device 20 may be built in one device, or may be individually attached to the vehicle 200.

In the above embodiments, an example in which the attitude detection device 40 includes the gyro sensor 41 has been described. The attitude detection device 40 may further include an acceleration sensor that detects acceleration of the vehicle 200, and may further output the detected acceleration as the attitude change amount. The attitude detection device 40 may further include a vehicle height sensor that detects a height from the road surface, and may further output the detected height as an attitude change amount. The attitude detection device 40 may further include other known sensors. The attitude detection device 40 may include one or more of an acceleration sensor, a vehicle speed sensor, and the like in addition to the gyro sensor 41. In this case, the gyro sensor 41, the acceleration sensor, the vehicle height sensor, and the like having a function as the attitude detection device 40 may be built in one device, or may be individually attached to the vehicle 200.

In the above embodiments, a case where the moving body is the vehicle 200 such as an automobile and a movable body such as a digital camera have been described. However, the moving body is not limited to the vehicle 200. The moving body may be a vehicle that travels on the ground, and may be, for example, a train or a motorcycle.

In the above embodiments, the case where the image is displayed in front of the moving body has been described. However, the position where the image is displayed is not limited to the front. For example, the image may be displayed in the side direction or the rear of the moving body.

In the above embodiments, an example in which the display system 100 is an HUD system has been described. However, the display system 100 does not need to be an HUD system. The display system 100 may include a liquid crystal display or an organic EL display instead of the projection device 10. The display system 100 may include a screen and a projector.

Outline of Embodiments (1) A display system of the present disclosure includes: a display processing device configured to control display of an image; an attitude detection device configured to detect an attitude change amount of a moving body; and a correction processing device including a vibration detector configured to determine whether or not an attitude change in the moving body having a specific frequency band component has been continuously generated for a certain period of time or more based on the attitude change amount. The correction processing device updates a correction amount of a display position of the image based on the attitude change amount when the vibration detector determines that the attitude change in the moving body having the specific frequency band component has not been continuously generated for the certain period of time or more, and sets an absolute value of the correction amount to be equal to or less than an absolute value of a correction amount at a time of last determination when the vibration detector determines that the attitude change in the moving body having the specific frequency band component has been continuously generated for the certain period of time or more. The vibration detector includes: a threshold value cross detector configured to detect that the attitude change amount or a variation amount calculated based on the attitude change amount has crossed a predetermined threshold value, a counter configured to measure the number of times the attitude change amount or the variation amount has crossed the threshold value in a unit time, and a vibration determiner configured to determine that the attitude change in the moving body having the specific frequency band component has been continuously generated for the certain period of time or more when the number of times measured by the counter is a count threshold value or more. The display processing device controls a display position of the image based on the correction amount.

Accordingly, it is possible to suppress the enlargement of the display deviation due to the attitude change in the moving body having a specific frequency band component, and to appropriately display the image. When the attitude change in the moving body is continuously generated for a certain period of time or more, the absolute value of the correction amount is set to be equal to or less than the absolute value of the correction amount at the last determination. Therefore, it is possible to prevent the vibration of the high-frequency component from being increased by the correction and displayed with respect to the vibration of the correction amount corresponding to the attitude change amount of the moving body, and it is possible to suppress discomfort and false recognition felt by a person viewing the image.

(2) In the display system according to (1), the correction processing device includes: a correction amount calculator configured to calculate the correction amount of the display position of the image based on the attitude change amount, and a correction amount adjuster configured to adjust the correction amount. The vibration detector includes a variation amount calculator configured to calculate the variation amount based on the attitude change amount. The correction amount adjuster adjusts the correction amount based on a determination result of the vibration determiner.

(3) In the display system according to (2), the vibration detector includes an offset removal filter that removes a low-frequency band component lower than a specific frequency band of the attitude change amount or the variation amount.

(4) In the display system according to (2) or (3), when the vibration determiner determines that the attitude change in the moving body having the specific frequency band component has been continuously generated for the certain period of time or more, the correction amount adjuster sets the correction amount to zero.

(5) In the display system according to (2) or (3), when the vibration determiner determines that the attitude change in the moving body having the specific frequency band component has been continuously generated for the certain period of time or more, the correction amount adjuster stops an update of the correction amount.

(6) In the display system according to (2) or (3), when the vibration determiner determines that the attitude change in the moving body having the specific frequency band component has been continuously generated for the certain period of time or more, the correction amount adjuster multiplies the correction amount by a coefficient larger than 0 and less than 1.

(7) In the display system according to any one of (1) to (6), the threshold value cross detector detects that an input value has changed from less than the threshold value to the threshold value or more, or from the threshold value or more to less than the threshold value.

(8) In the display system according to any one of (1) to (7), the threshold value is zero or a specific value indicating an offset value of the attitude detection device.

(9) In the display system according to any one of (1) to (8), the specific frequency band component is a component of a high-frequency band higher than a predetermined frequency.

(10) In the display system according to any one of (1) to (8), the specific frequency band component is a component of a high-frequency band higher than a frequency F satisfying a following relation, $$F = 1/(2 \times T)$$

where T is a total delay time from correction amount calculation to display of an image.

(11) In the display system according to any one of (1) to (8), the specific frequency band component is a component of a high-frequency band higher than 2.5 Hz.

(12) In the display system according to any one of (1) to (11), a projection device configured to project light representing the image is further included.

(13) In the display system according to any one of (1) to (12), the moving body is a vehicle. The image is a virtual image to be displayed in front of a windshield of the vehicle.

(14) A vibration detection system of the present disclosure includes: an attitude detection device configured to detect an attitude change amount of a moving body; a threshold value cross detector configured to detect that the attitude change amount or a variation amount calculated based on the attitude change amount has crossed a predetermined threshold value; a counter configured to measure the number of times the attitude change amount or the variation amount has crossed the threshold value in a unit time; and a vibration determiner configured to determine that an attitude change in a moving body having a specific frequency band component has been continuously generated for a certain period of time or more when the number of times measured by the counter is a count threshold value or more.

Accordingly, since the correction amount corresponding to the attitude change amount is adjusted while the vibration having a specific frequency band component is generated in the attitude change amount or the variation amount for a certain period of time or more, it is possible to suppress the enlargement of the correction error caused by the vibration having a specific frequency band component.

(15) In the vibration detection system according to (14), a variation amount calculator configured to calculate the variation amount based on the attitude change amount is included.

(16) In the vibration detection system according to (14), the specific frequency band component is a component of a high-frequency band higher than a predetermined frequency.

The display system described in the present disclosure is implemented in cooperation with hardware resources, for example, a processor, a memory, and a program, and the like.

The present disclosure is applicable to a display system that displays a virtual image in front of a windshield.

What is claimed is:

1. A display system comprising:
a display processing device configured to control display of an image;
an attitude detection device configured to detect an attitude change amount of a moving body; and
a correction processing device including a vibration detector configured to determine whether or not an attitude change in the moving body having a specific frequency band component has been continuously generated for a certain period of time or more based on the attitude change amount,
wherein the vibration detector includes:
a threshold value cross detector configured to detect that the attitude change amount or a variation amount calculated based on the attitude change amount has crossed a predetermined threshold value,
a counter configured to measure the number of times the attitude change amount or the variation amount has crossed the threshold value in a unit time, and
a vibration determiner configured to determine that the attitude change in the moving body having the specific frequency band component has been continuously generated for the certain period of time or more when the number of times measured by the counter is a count threshold value or more,
wherein the correction processing device updates a correction amount of a display position of the image based on the attitude change amount when the vibration determiner determines that the attitude change in the moving body having the specific frequency band component has not been continuously generated for the certain period of time or more, and sets the correction amount a value obtained by multiplying the last determined correction amount by a coefficient larger than 0 and less than 1 when the vibration determiner determines that the attitude change in the moving body having the specific frequency band component has been continuously generated for the certain period of time or more, and
wherein the display processing device controls a display position of the image based on the correction amount.

2. The display system according to claim 1,
wherein the correction processing device includes:
a correction amount calculator configured to calculate the correction amount of the display position of the image based on the attitude change amount, and
a correction amount adjuster configured to adjust the correction amount,
wherein the vibration detector includes a variation amount calculator configured to calculate the variation amount based on the attitude change amount, and
wherein the correction amount adjuster multiplies the correction amount by the coefficient based on a determination result of the vibration determiner.

3. The display system according to claim 1,
wherein the vibration detector includes an offset removal filter set to a cutoff frequency lower than the specific frequency band of the attitude change amount or the variation amount.

4. The display system according to claim 2,
wherein when the vibration determiner determines that the attitude change in the moving body having the specific frequency band component has been continuously generated for the certain period of time or more, the correction amount adjuster sets the correction amount to zero.

5. The display system according to claim 2,
wherein when the vibration determiner determines that the attitude change in the moving body having the specific frequency band component has been continuously generated for the certain period of time or more, the correction amount adjuster stops an update of the correction amount.

6. The display system according to claim 1,
wherein the threshold value cross detector detects that an input value has changed from less than the threshold value to the threshold value or more, or from the threshold value or more to less than the threshold value.

7. The display system according to claim 1,
wherein the threshold value is zero or a specific value indicating an offset value of the attitude detection device.

8. The display system according to claim 1,
wherein the specific frequency band component is a component of a high-frequency band higher than a predetermined frequency.

9. The display system according to claim 1,
wherein the specific frequency band component is a component of a high-frequency band higher than a frequency F satisfying a following relation, $$F=1/(2\times T),$$

where T is a total delay time from correction amount calculation to display of the image.

10. The display system according to claim 1,
wherein the specific frequency band component is a component of a high-frequency band higher than 2.5 Hz.

11. The display system according to claim 1, further comprising:
a projection device configured to project light representing the image.

12. The display system according to claim 1,
wherein the moving body is a vehicle, and
wherein the image is a virtual image to be displayed in front of a windshield of the vehicle.

13. The display system according to claim 3,
wherein when the vibration determiner determines that the attitude change in the moving body having the specific frequency band component has been continuously generated for the certain period of time or more, the correction amount adjuster sets the correction amount to zero.

14. The display system according to claim 3,
wherein when the vibration determiner determines that the attitude change in the moving body having the specific frequency band component has been continuously generated for the certain period of time or more, the correction amount adjuster stops an update of the correction amount.

\* \* \* \* \*